US010911910B2

United States Patent
Park et al.

(10) Patent No.: US 10,911,910 B2
(45) Date of Patent: Feb. 2, 2021

(54) ELECTRONIC DEVICE AND METHOD OF EXECUTING FUNCTION OF ELECTRONIC DEVICE

(71) Applicant: SAMSUNG ELECTRONICS CO., LTD., Suwon-si (KR)

(72) Inventors: Junhyung Park, Suwon-si (KR); Nojoon Park, Suwon-si (KR); Hyojung Lee, Suwon-si (KR); Taehee Lee, Suwon-si (KR); Hanjib Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/394,238

(22) Filed: Apr. 25, 2019

(65) Prior Publication Data

US 2019/0342727 A1 Nov. 7, 2019

(30) Foreign Application Priority Data

May 4, 2018 (KR) .......................... 10-2018-0051918

(51) Int. Cl.
*H04M 3/42* (2006.01)
*H04W 4/20* (2018.01)
(Continued)

(52) U.S. Cl.
CPC ............... *H04W 4/20* (2013.01); *G10L 15/22* (2013.01); *G10L 17/24* (2013.01)

(58) Field of Classification Search
CPC ........... G10L 15/22; G10L 17/24; H04W 4/20
See application file for complete search history.

(56) References Cited

U.S. PATENT DOCUMENTS

2005/0288933 A1\* 12/2005 Nakamura .............. G10L 15/26
704/270
2007/0162281 A1\* 7/2007 Saitoh ................... G10L 15/197
704/251
(Continued)

FOREIGN PATENT DOCUMENTS

KR 10-2014-0066467 2/2014
KR 10-2014-0067514 6/2014
(Continued)

OTHER PUBLICATIONS

International Search Report dated Aug. 14, 2019 in counterpart International Patent Application No. PCT/KR2019/005148.

*Primary Examiner* — Charles T Shedrick
(74) *Attorney, Agent, or Firm* — Nixon & Vanderhye P.C.

(57) ABSTRACT

According to various embodiments of the disclosure, an electronic device and a method of executing a function of the electronic device comprise at least one communication circuit, a speaker, a microphone, at least one processor operatively connected with the communication circuit, the speaker, and the microphone, and a memory operatively connected with the at least one processor, wherein the memory stores instructions which, when executed by the at least one processor cause the electronic device to: perform a call with a first external electronic device through the communication circuit, activate a voice-based intelligent service while the call is performed, identify a voice input through the microphone while the call is performed, and transmit data associated with the voice input to an external server through the communication circuit at least in part for automatic speech recognition (ASR) and/or natural language understanding (NLU).

16 Claims, 18 Drawing Sheets

(51) Int. Cl.
*G10L 17/24* (2013.01)
*G10L 15/22* (2006.01)

(56) References Cited

U.S. PATENT DOCUMENTS

| | | |
|---|---|---|
| 2012/0173233 A1 | 5/2012 | Seo |
| 2013/0262126 A1* | 10/2013 | Schalk .................... G10L 15/00 704/275 |
| 2013/0339015 A1* | 12/2013 | Lee ....................... G10L 21/003 704/235 |
| 2014/0303969 A1* | 10/2014 | Inose ...................... G10L 15/22 704/231 |
| 2015/0049160 A1 | 2/2015 | Krishnamoorthy et al. |
| 2017/0295117 A1 | 1/2017 | Pfriem et al. |
| 2017/0046111 A1* | 2/2017 | Chu .................... H04L 65/1069 |
| 2017/0339540 A1* | 11/2017 | Jeong ................... G06F 3/0488 |
| 2018/0061412 A1* | 3/2018 | Cho ........................ G10L 17/08 |
| 2018/0164946 A1* | 6/2018 | Noguchi ............. G02F 1/13338 |
| 2018/0203850 A1* | 7/2018 | Zheng ................... G06F 40/58 |
| 2019/0304450 A1* | 10/2019 | Kwon ................... G10L 15/183 |
| 2019/0347331 A1* | 11/2019 | Yu ........................... G10L 15/22 |
| 2020/0027456 A1* | 1/2020 | Kim ....................... G06N 5/025 |

FOREIGN PATENT DOCUMENTS

| | | |
|---|---|---|
| KR | 10-2016-0043985 | 4/2016 |
| KR | 10-2017-0018124 | 2/2017 |
| KR | 10-2017-0084551 | 7/2017 |
| KR | 10-2017-0091913 | 8/2017 |

* cited by examiner

ELECTRONIC DEVICE AND METHOD OF EXECUTING FUNCTION OF ELECTRONIC DEVICE

CROSS-REFERENCE TO RELATED APPLICATION

This application is based on and claims priority under 35 U.S.C. 119 to Korean Patent Application No. 10-2018-0051918, filed on May 4, 2018, in the Korean Intellectual Property Office, the disclosure of which is incorporated by reference herein in its entirety.

BACKGROUND

Field

The disclosure relates to electronic devices and methods of executing the functions of the electronic devices.

Description of Related Art

Artificial intelligence systems are computer systems capable of implementing human-like intelligence, which allow machines self-learning and decisions and provide a better recognition as they are used more.

Artificial intelligence technology may include element techniques, such as machine learning (deep learning) which utilizes algorithms capable of classifying and learning the features of obtained data on their own and copying the perception or determination by the human brain using machine learning algorithms.

Such element techniques may include linguistic understanding which recognizes human languages/words, visual understanding which recognizes things as if humans visually do, inference/prediction which determines information and perform logical inference and prediction, knowledge expression which processes human experience information as knowledge data, and motion control which controls robot motions and driver-less vehicles.

Linguistic understanding may refer, for example, to technology for recognizing and applying/processing a human being's language or text, and this encompasses natural language processing, machine translation, dialog system, answering inquiries, and speech recognition/synthesis.

Inference prediction may refer, for example, to a technique of determining and logically inferring and predicting information, encompassing knowledge/probability-based inference, optimization prediction, preference-based planning, and recommendation.

Knowledge expression may refer, for example, to a technique of automatically processing human experience information, covering knowledge buildup (data production/classification) or knowledge management (data utilization).

An electronic device does not support technology for activating an intelligent system when, for example, a telephone call is connected between the electronic device and another electronic device. The user may encounter such an occasion that he needs to obtain necessary information or share information with the other party using the intelligent system while being on the phone with the other party.

The above information is presented as background information only to assist with an understanding of the disclosure. No determination has been made, and no assertion is made, as to whether any of the above might be applicable as prior art with regard to the disclosure.

SUMMARY

According to various example embodiments of the disclosure, an electronic device and a method of executing the functions of the electronic device may activate an intelligent system during a call, for example, a call with another electronic device.

According to various example embodiments of the disclosure, an electronic device and a method of executing the functions of the electronic device may identify an utterance obtained while being on the phone with another electronic device and provide services related to the utterance.

According to an example embodiment of the disclosure, an electronic device comprises at least one communication circuit, a speaker, a microphone, at least one processor operatively connected with the communication circuit, the speaker, and the microphone, and a memory operatively connected with the at least one processor, wherein the memory stores instructions which, when executed by the processor, cause the electronic device to: perform a call with a first external electronic device through the communication circuit, activate a voice-based intelligent service while the call is performed, identify a user's voice input through the microphone while the call is performed, and transmit data associated with the voice input to an external server through the communication circuit at least in part for automatic speech recognition (ASR) and/or natural language understanding (NLU).

According to an example embodiment of the disclosure, a server comprises a communication circuit, at least one processor operatively connected with the communication circuit, and a memory operatively connected with the at least one processor, wherein the memory stores instructions which, when executed by the processor, cause the server to: receive data associated with a voice input related to a first external electronic device from an electronic device performing a call with the first external electronic device through the communication circuit while the call is performed between the electronic device and the first external electronic device, perform, at least in part, ASR and/or NLU on the voice input, and transmit a result of performing the ASR and/or NLU to the electronic device and/or the first external electronic device.

According to an example embodiment of the disclosure, a method of executing a function of an electronic device comprises performing a call with a first external electronic device, activating a voice-based intelligent service while the call is performed, identifying a user's voice input through a microphone of the electronic device while the call is performed, and transmitting data associated with the voice input to an external server at least in part for ASR and/or NLU.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

The above and other aspects, features and advantages of certain embodiments of the present disclosure will be more apparent from the following detailed description, taken in conjunction with the accompanying drawings, in which.

Throughout the drawings, like reference numerals will be understood to refer to like parts, components, and structures.

DETAILED DESCRIPTION

Figure 1:
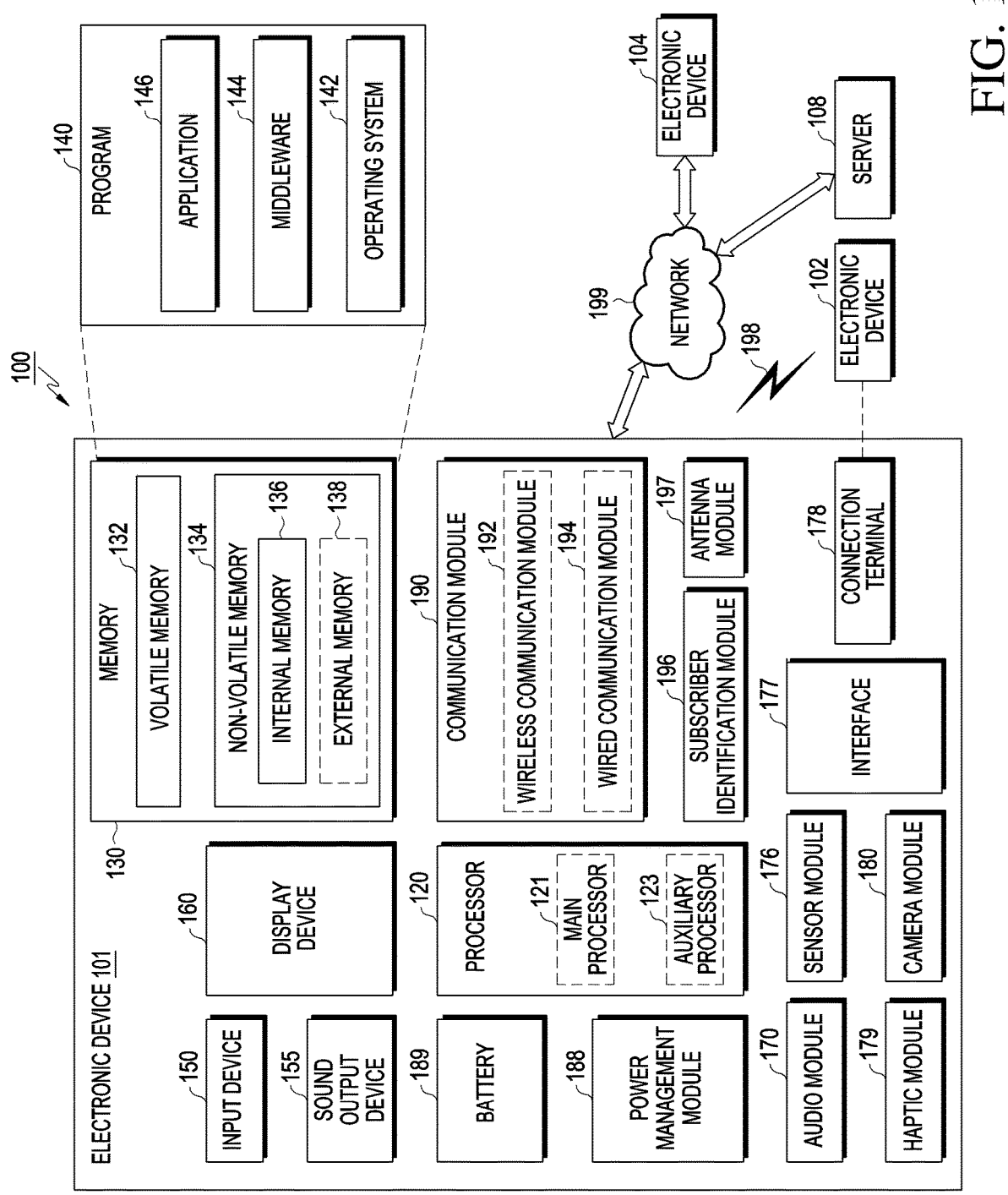
FIG. 1 is a block diagram illustrating an example electronic device in a network environment according to an embodiment of the disclosure.

Hereinafter, various example embodiments of the disclosure are described with reference to the accompanying drawings. However, it should be appreciated that the disclosure is not limited to the embodiments and the terminology used herein, and all changes and/or equivalents or replacements thereto also belong to the scope of the disclosure.

The same or similar reference denotations may be used to refer to the same or similar elements throughout the disclosure and the drawings. It is to be understood that the singular forms "a," "an," and "the" include plural references unless the context clearly dictates otherwise. As used herein, the terms "A or B" or "at least one of A and/or B" may include all possible combinations of A and B.

As used herein, the terms "configured to" may be interchangeably used with other terms, such as "suitable for," "capable of," "modified to," "made to," "adapted to," "able to," or "designed to" in hardware or software or any combination thereof based on the context. The term "configured to" may refer, for example, to a situation in which a device can perform an operation together with another device or parts. For example, the term "processor configured (or set) to perform A, B, and C" may refer, for example, and without limitation, to a generic-purpose processor (e.g., a CPU or application processor) that may perform the operations by executing one or more software programs stored in a memory device, a dedicated processor (e.g., an embedded processor), or the like, for performing the operations.

Examples of the electronic device according to embodiments of the disclosure may include, for example, and without limitation, at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a MP3 player, a medical device, a camera, a wearable device, or the like. The wearable device may include, for example, and without limitation, at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), a body implantable device, or the like.

In some embodiments, examples of the smart home appliance may include, for example, and without limitation, at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, an electronic picture frame, or the like.

According to an embodiment of the disclosure, the electronic device may include, for example, and without limitation, at least one of various medical devices (e.g., diverse portable medical measuring devices (a blood sugar measuring device, a heartbeat measuring device, a body temperature measuring device, etc.), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, drones, automatic teller's machines (ATMs), point of sales (POS) devices, internet of things (IoT) devices (e.g., a bulb, various sensors, a sprinkler, a fire alarm, a thermostat, a street light, a toaster, fitness equipment, a hot water tank, a heater, or a boiler), or the like.

According to various embodiments of the disclosure, examples of the electronic device may include, for example, and without limitation, at least one of part of a piece of furniture, building/structure or vehicle, an electronic board, an electronic signature receiving device, a projector, various measurement devices (e.g., devices for measuring water, electricity, gas, or electromagnetic waves), or the like. According to embodiments of the disclosure, the electronic device may be flexible or may be a combination of the above-enumerated electronic devices.

According to an embodiment of the disclosure, the electronic devices are not limited to those described above. As used herein, the term "user" may denote a human or another device (e.g., an artificial intelligent electronic device) using the electronic device.

FIG. 1 is a block diagram illustrating an example electronic device 101 in a network environment according to various embodiments.

Referring to FIG. 1, the electronic device 101 in the network environment 100 may communicate with an electronic device 102 (or a second external electronic device) via a first network 198 (e.g., a short-range wireless communication network), or an electronic device 104 (or an external electronic device or a first external electronic device) or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 388 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101.

According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
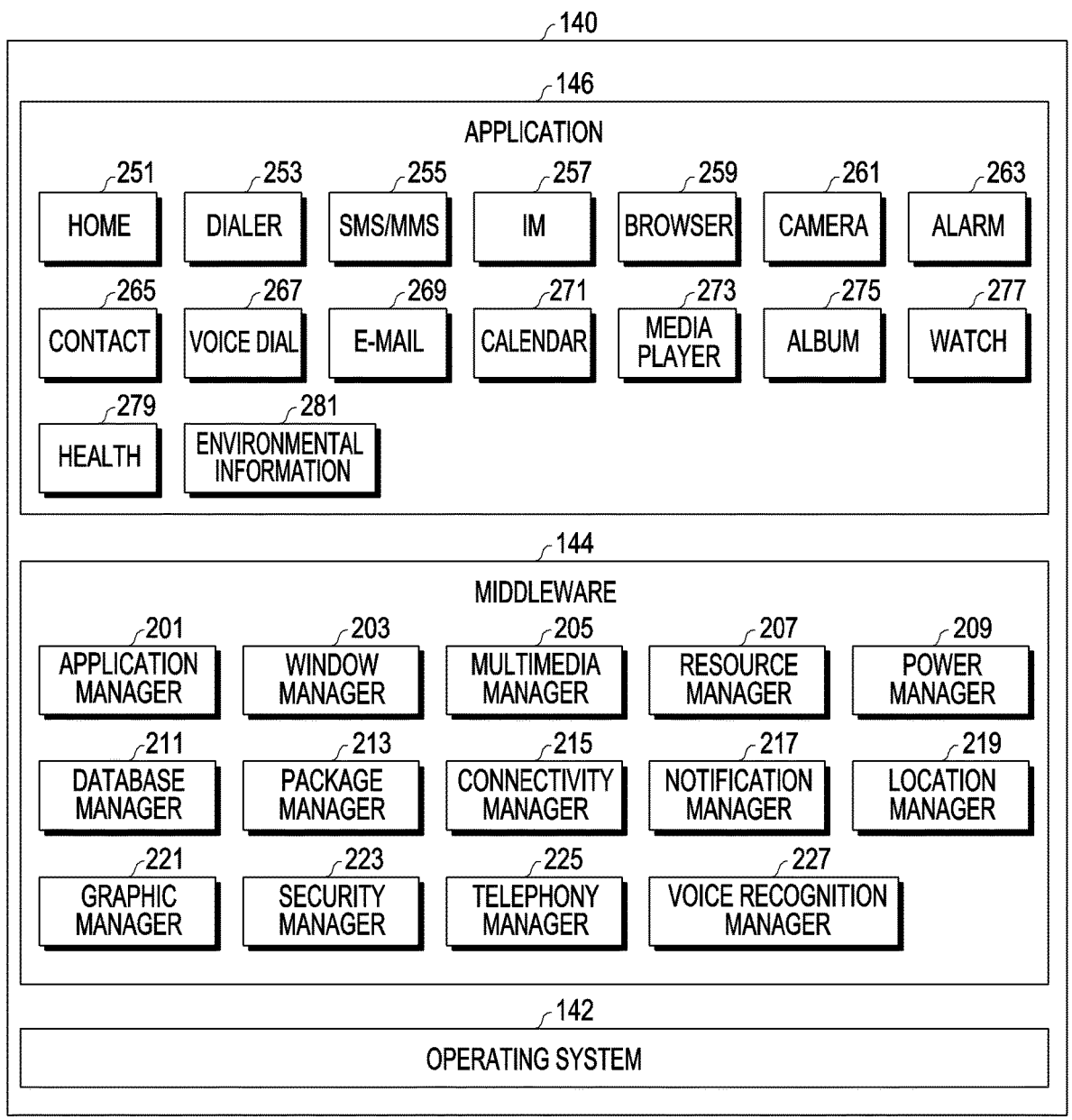
FIG. 2 is a block diagram illustrating an example configuration of a program according to an embodiment of the disclosure.

FIG. 2 is a block diagram illustrating an example configuration of a program 140 according to an embodiment of the disclosure.

Referring to FIG. 2 the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bath™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, and/or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice dialer 267, email 269, calendar 271, media player 273, album 275, watch 277, health 279 (e.g., for measuring the degree of workout or biometric information, such as blood sugar), and/or environmental information 281 (e.g., for measuring air pressure, humidity, or temperature information) application.

According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

Before describing various example embodiments of the disclosure, an integrated intelligent system to which an embodiment of the disclosure may apply is described.

Figure 3A:
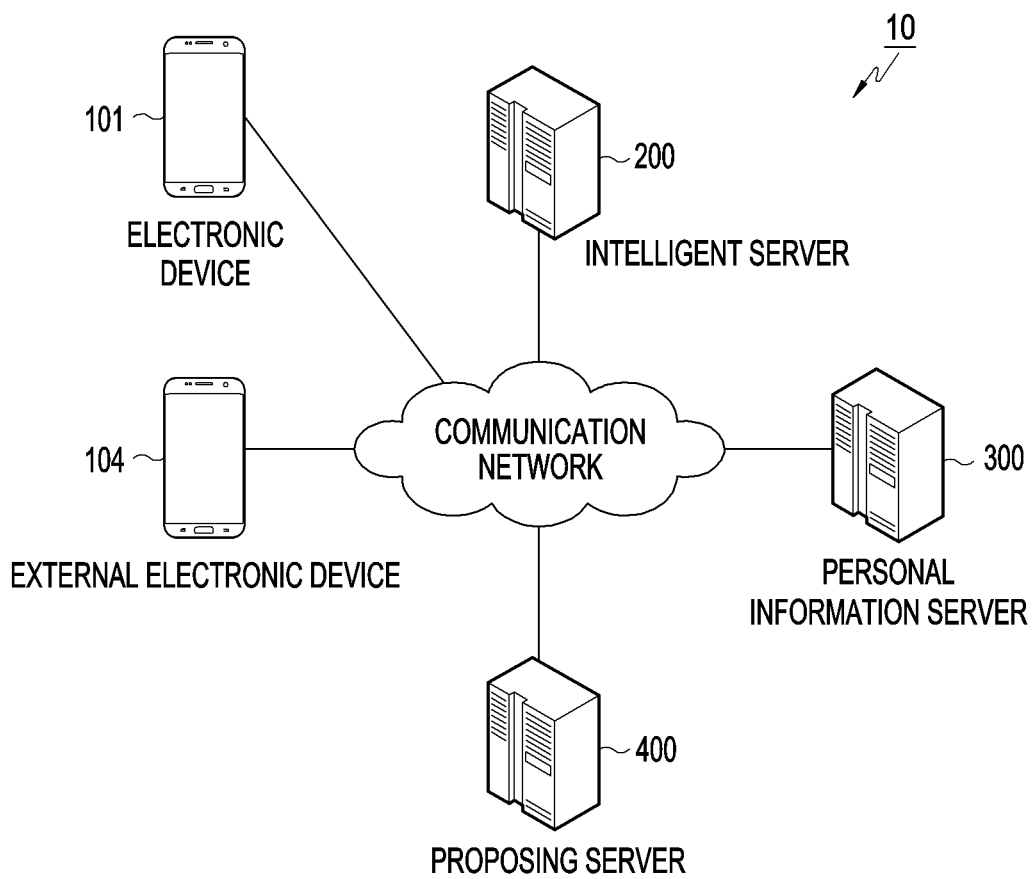
FIG. 3A is a diagram illustrating an example integrated intelligent system according to an embodiment of the disclosure.

FIG. 3A is a diagram illustrating an example integrated intelligent system according to an embodiment of the disclosure.

Referring to FIG. 3A, an integrated intelligent system 10 may include at least two electronic devices (e.g., the electronic device 101 (e.g., a user terminal) and the external electronic device 104), an intelligent server 200, a personal information server 300, and/or a proposing server 400. For example, the two electronic devices may perform a call via a communication network.

The at least two electronic devices (e.g., the electronic device 101 and the external electronic device 104) may provide services necessary for the user through apps (or application programs) (e.g., an alarm app, message app, photo (gallery) app, etc.) stored in the at least two electronic devices. For example, the electronic device (e.g., 101 or 104) may execute and operate another app through an intelligent app (or speech recognition app) stored in the electronic device (e.g., 101 or 104). The intelligent app of the electronic device (e.g., 101 or 104) may receive user inputs to execute and operate the other app through the intelligent app. The user inputs may be received through, e.g., a physical button, touchpad, voice input, or remote input. According to an embodiment of the disclosure, the electronic device (e.g., 101 or 104) may be various terminal devices (or electronic devices) connectable to the internet, such as a cellular phone, smartphone, personal digital assistant (PDA), or laptop computer.

According to an embodiment of the disclosure, the electronic device (e.g., 101 or 104) may receive a user utterance as a user input. The electronic device (e.g., 101 or 104) may receive the user utterance and generate a command to operate the app based on the user utterance. Accordingly, the electronic device (e.g., 101 or 104) may operate the app using the command.

The intelligent server 200 may receive the user's voice input from the electronic device (e.g., 101 or 104) through a communication network and convert the voice input into text data. According to an embodiment of the disclosure, the intelligent server 200 may generate (or select) a path rule based on the text data. The path rule may include information about actions (or operations) to perform the functions of the app or information about parameters necessary to execute the operations. Further, the path rule may include the order of the operations of the app. The electronic device (e.g., 101 or 104) may receive the path rule, select an app according to the path rule, and execute the operations included in the path rule on the selected app.

As used herein, the term "path rule" may generally refer, for example, to a sequence of states for the electronic device to perform a task requested by the user, but not limited thereto. In other words, the path rule may contain information about a sequence. The task may be a certain action that, e.g., an intelligence app may provide. The task may include, for example, and without limitation, producing a schedule, transmitting a photo to a desired party, providing weather information, or the like. The electronic device (e.g., 101 or 104) may perform the task by sequentially having at least one or more states (e.g., operation states of the electronic device (e.g., 101 or 104)).

According to an embodiment, the path rule may be provided or created by an artificial intelligence (AI) system. The AI system may refer, for example, to a rule-based system and/or a neural network-based system (e.g., feed-forward neural network (FNN)) or recurrent neutral network (RNN)). The AI system may be a combination thereof or a system different therefrom. According to an embodiment, the path rule may be selected from a set of pre-defined path rules or be created in real-time in response to a user request. For example, the AI system may select at least one among a plurality of pre-defined path rules or may dynamically (or real-time) create a path rule. The electronic device (e.g., 101 or 104) may use a hybrid system to provide the path rule.

According to an embodiment, the electronic device (e.g., 101 or 104) may execute the operation and display, on the display, a screen corresponding to the state of the electronic device (e.g., 101 or 104) which executes the operation. As another example, the electronic device (e.g., 101 or 104) may execute the operation and refrain from displaying a result of the operation on the display. The electronic device (e.g., 101 or 104) may execute, e.g., a plurality of operations and display, on the display, at least in part of results of the plurality of operations. The electronic device (e.g., 101 or 104) may display, on the display, e.g., the results of executing only the last operation in order. As another example, the electronic device (e.g., 101 or 104) may display, on the display, a result of executing the operation according to receiving a user input.

The personal information server 300 may include a database storing user information. For example, the personal information server 300 may receive user information (e.g., context information or app execution) from the electronic device (e.g., 101 or 104) and store the user information in the database. The intelligent server 200 may receive the user information from the personal information server 300 through the communication network and use the same in creating a path rule for user inputs. According to an embodiment of the disclosure, the electronic device (e.g., 101 or 104) may receive user information from the personal information server 300 through the communication network and use the received user information as information for managing the database.

The proposing server 400 may include a database that stores information about functions to be provided and/or introductions of applications and/or functions in the terminal. For example, the proposing server 400 may receive user information of the user terminal (e.g., the electronic device 101) from the personal information server 300 and include a database for functions that the user may use. The electronic device (e.g., 101 or 104) may receive the information about functions to be provided from the proposing server 400 through the communication network and provide the information to the user.

Figure 3B:
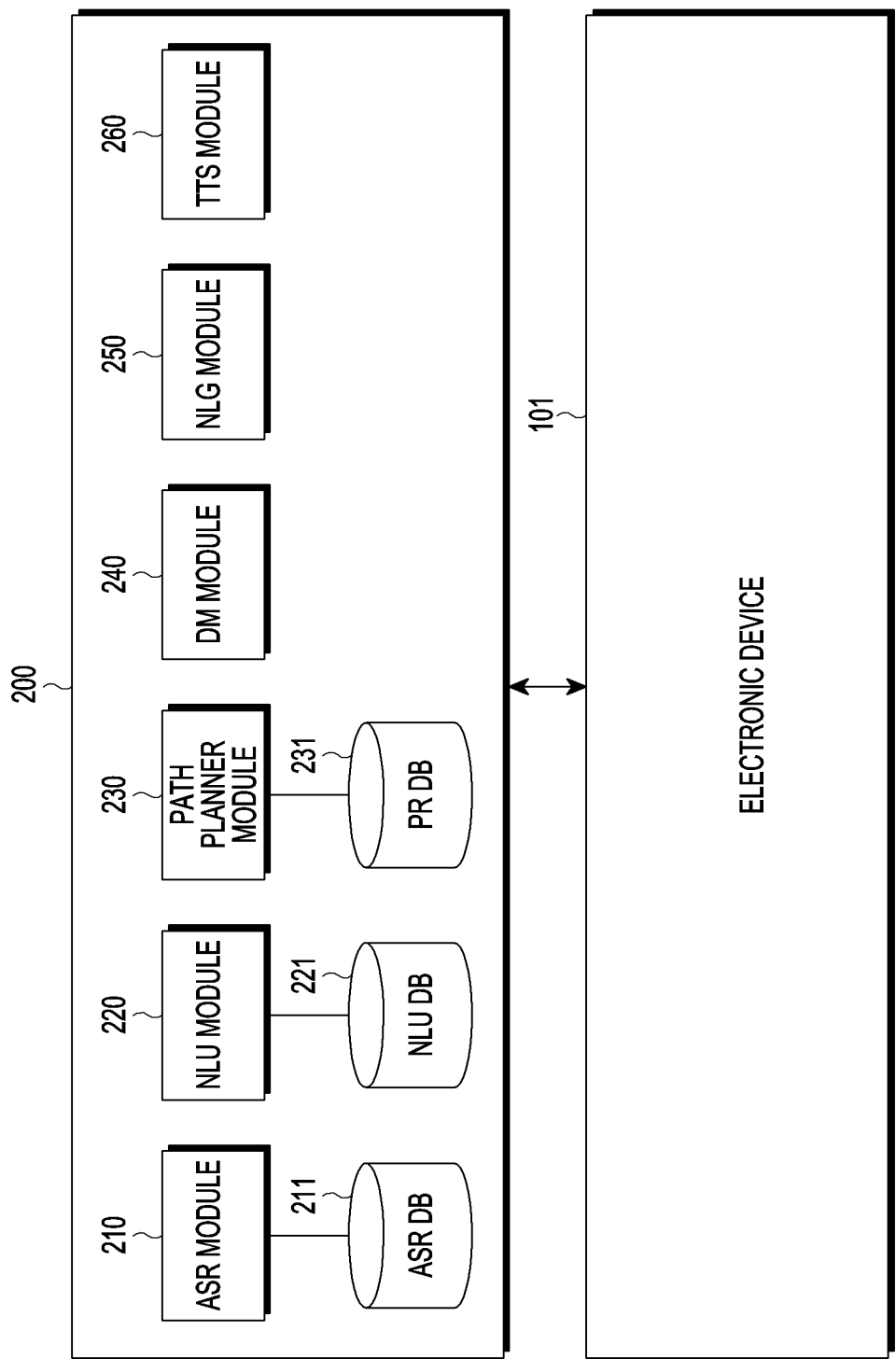
FIG. 3B is a block diagram illustrating an example configuration of an intelligent server of an intelligent system according to an embodiment of the disclosure.

FIG. 3B is a block diagram illustrating an example configuration of an intelligent server of an intelligent server according to an embodiment of the disclosure;

Referring to FIG. 3B, an intelligent server 200 may include an automatic speech recognition (ASR) module (e.g., including processing circuitry and/or executable program elements) 210, a natural language understanding (NLU) module (e.g., including processing circuitry and/or executable program elements) 220, a path planner module (e.g., including processing circuitry and/or executable program elements) 230, a dialogue manager (DM) module (e.g., including processing circuitry and/or executable program elements) 240, a natural language generator (NLG) module (e.g., including processing circuitry and/or executable program elements) 250, and/or a text-to-speech (TTS) module (e.g., including processing circuitry and/or executable program elements) 260. According to an embodiment, the intelligent server 200 may include a communication circuit, a memory, and a processor. The processor may execute commands stored in the memory to drive the ASR module 210, the NLU module 220, the path planner module 230, the DM module 240, the NLG module 250, and the TTS module 260. The intelligent server 200 may transmit or receive data (or information) to/from an external electronic device (e.g., the electronic device (e.g., 101 or 104)) through the communication circuit.

The NLU module 220 or the path planner module 230 of the intelligent server 200 may generate a path rule.

According to an embodiment of the disclosure, the ASR module 210 may include various processing circuitry and/or executable program elements and convert user inputs received from the electronic device (e.g., 101 or 104) into text data.

According to an embodiment of the disclosure, the ASR module 210 may convert user inputs received from the electronic device (e.g., 101 or 104) into text data. For example, the ASR module 210 may include a speech recognition module. The speech recognition module may include an acoustic model and a language model. For example, the acoustic modem may include vocalization-related information, and the language model may include unit phonemic information and combinations of pieces of unit phonemic information. The speech recognition module may convert user utterances into text data using the vocalization-related information and unit phonemic information. Information about the acoustic model and the language model may be stored in, e.g., an automatic speech recognition (ASR) database (DB) 211.

According to an embodiment of the disclosure, the NLU module 220 may include various processing circuitry and/or executable program elements and perform syntactic analysis and/or semantic analysis to understand the user's intent. Based on the syntactic analysis, the user input may be divided into syntactic units (e.g., words, phrases, or morphemes) and what syntactic elements the syntactic units have may be understood. The semantic analysis may be performed using, e.g., semantic matching, rule matching, or formula matching. Thus, the NLU module 220 may obtain a domain, intent, or parameters (or slots) necessary to represent the intent for the user input.

According to an embodiment of the disclosure, the NLU module 220 may determine the user's intent and parameters using the matching rule which has been divided into the domain, intent, and parameters (or slots) necessary to understand the intent. For example, one domain (e.g., an alarm) may include a plurality of intents (e.g., alarm settings or releasing alarm), and one intent may include a plurality of parameters (e.g., time, repetition count, or alarm sound). The plurality of rules may include, e.g., one or more essential element parameters. The matching rule may be stored in a natural language understanding (NLU) database (DB) 221.

According to an embodiment of the disclosure, the NLU module 220 may identify the meaning of a word extracted from the user input using linguistic features (e.g., syntactic elements) such as morphemes and/or phrases, match the identified meaning of the word to the domain and intent, and determine the user's intent. For example, the NLU module 220 may calculate how many words extracted from the user input are included in each domain and intent to thereby determine the user's intent. According to an embodiment of the disclosure, the NLU module 220 may determine the parameters of the user input using the word which is a basis for determining the intent.

According to an embodiment of the disclosure, the NLU module 220 may determine the user's intent using the NLU DB 221 storing the linguistic features for determining the intent of the user input. According to an embodiment of the disclosure, the NLU module 220 may determine the user's intent using a personal language model (PLM). For example, the NLU module 220 may determine the user's intent using personal information (e.g., contacts list or music list). The PLM may be stored in, e.g., the NLU DB 221. According to an embodiment of the disclosure, the ASR module 210, but not the NLU module 220 alone, may recognize the user's voice by referring to the PLM stored in the NLU DB 221.

According to an embodiment of the disclosure, the NLU module 220 may generate a path rule based on the intent of the user input and parameters. For example, the NLU module 220 may select an app to be executed based on the intent of the user input and determine operations to be performed on the selected app. The NLU module 220 may determine parameters corresponding to the determined operations to generate a path rule. According to an embodiment of the disclosure, the path rule generated by the NLU module 220 may include information about the app to be executed, operations (e.g., at least one or more states) to be executed on the app, and the parameters necessary to execute the operations.

According to an embodiment of the disclosure, the NLU module 220 may generate one or more path rules based on the parameters and intent of the user input. For example, the NLU module 220 may receive a path rule set corresponding to the electronic device (e.g., 101 or 104) from the path planner module 230, map the parameters and intent of the user input to the received path rule set, and determine the path rule.

According to an embodiment of the disclosure, the NLU module 220 may determine the app to be executed, operations to be executed on the app, and parameters necessary to execute the operations based on the parameters and intent of the user input, thereby generating one or more path rules. For example, the NLU module 220 may generate a path rule by arranging the app to be executed and the operations to be executed on the app in the form of ontology or a graph model according to the user input using the information of the electronic device (e.g., 101 or 104). The generated path rule may be stored through, e.g., the path planner module 230 in a path rule database (PR DB) 231. The generated path rule may be added to the path rule set of the database 231.

According to an embodiment of the disclosure, the NLU module 220 may select at least one of a plurality of path rules generated. For example, the NLU module 220 may select the optimal one of the plurality of path rules. As another example, the NLU module 220 may select a plurality of path rules when at least in part of operations are specified based on the user utterance. The NLU module 220 may determine one of the plurality of path rules by the user's additional input.

According to an embodiment of the disclosure, the NLU module 220 may send the path rule to the electronic device (e.g., 101 or 104) at a request for the user input. For example, the NLU module 220 may send one path rule corresponding to the user input to the electronic device (e.g., 101 or 104). As another example, the NLU module 220 may send a plurality of path rules corresponding to the user input to the electronic device (e.g., 101 or 104). For example, when at least in part of operations are specified based on the user utterance, the plurality of path rules may be generated by the NLU module 220.

According to an embodiment of the disclosure, the path planner module 230 may include various processing circuitry and/or executable program elements and select at least one of the plurality of path rules.

According to an embodiment of the disclosure, the path planner module 230 may transfer a path rule set including the plurality of path rules to the NLU module 220. The plurality of path rules in the path rule set may be stored in the form of, for example, a table in the path rule database 231 connected with the path planner module 230. For example, the path planner module 230 may transfer a path rule set corresponding to information (e.g., OS information or app information) of the electronic device (e.g., 101 or 104) which is received from the intelligent agent 145 (see, e.g., FIG. 4) to the NLU module 220. The table stored in the path rule database 231 may be stored, e.g., per domain or per domain version.

According to an embodiment of the disclosure, the path planner module 230 may select one or more path rules from the path rule set and transfer the selected one or more path rules to the NLU module 220. For example, the path planner module 230 may match the user's intent and parameters to the path rule set corresponding to the electronic device (e.g., 101 or 104) to select one or more path rules and transfer the selected one or more path rules to the NLU module 220.

According to an embodiment of the disclosure, the path planner module 230 may generate one or more path rules using the user's intent and parameters. For example, the path planner module 230 may determine an app to be executed and operations to be executed on the app based on the user's intent and parameters to generate one or more path rules. According to an embodiment of the disclosure, the path planner module 230 may store the generated path rule in the path rule database 231.

According to an embodiment of the disclosure, the path planner module 230 may store the path rule generated by the NLU module 220 in the path rule database 231. The generated path rule may be added to the path rule set stored in the path rule database 231.

According to an embodiment of the disclosure, the table stored in the path rule database 231 may include a plurality of path rules and/or a plurality of path rule sets. The plurality of path rule or the plurality of path rule sets may reflect the kind, version, type, or nature of the device performing each path rule.

According to an embodiment of the disclosure, the DM module 240 may include various processing circuitry and/or executable program elements and determine whether the user's intent determined by the path planner module 230 is clear. For example, the DM module 240 may determine whether the user's intent is clear based on whether parameter information is sufficient. The DM module 240 may determine whether the parameters determined by the NLU module 220 are sufficient to perform a task. According to an embodiment of the disclosure, when the user's intent is unclear, the DM module 240 may perform feedback to send a request for necessary information to the user. For example, the DM module 240 may perform feedback to send a request for parameter information to determine the user's intent.

According to an embodiment of the disclosure, the DM module 240 may include a content provider module. When the operation can be performed based on the intent and parameters determined by the NLU module 220, the content provider module may generate the results of performing the task corresponding to the user input. According to an embodiment of the disclosure, the DM module 240 may send the results generated by the content provider module to the electronic device (e.g., 101 or 104) in response to the user input.

According to an embodiment of the disclosure, the NLG module 250 may include various processing circuitry and/or executable program elements and convert designated information into text. The text information may be in the form of a natural language utterance. The designated information may be, e.g., information about an additional input, information indicating that the operation corresponding to the user input is complete, or information indicating the user's additional input (e.g., feedback information for the user input). The text information may be sent to the electronic device (e.g., 101 or 104) and displayed on the display device 160, or the text information may be sent to the TTS module 260 and converted into a voice.

According to an embodiment of the disclosure, the TTS module 260 may include various processing circuitry and/or executable program elements and convert text information into voice information. The TTS module 260 may receive the text information from the NLG module 250, convert the text information into voice information, and send the voice information to the electronic device (e.g., 101 or 104). The electronic device (e.g., 101 or 104) may output the voice information through the sound output device 155.

According to an embodiment of the disclosure, the NLU module 220, the path planner module 230, and the DM module 240 may be implemented in a single module. For example, the NLU module 220, the path planner module 230, and the DM module 240 may be implemented in a single module to determine the user's intent and parameter and to generate a response (e.g., a path rule) corresponding to the user's intent and parameters determined. Accordingly, the generated response may be transmitted to the electronic device (e.g., 101 or 104).

According to an embodiment of the disclosure, a server (e.g., the intelligent server 200) comprises a communication circuit, a processor operatively connected with the communication circuit, and a memory operatively connected with the processor, wherein the memory stores instructions which, when executed by the processor, cause the server to receive a voice input related to a first external electronic device (e.g., the external electronic device 104) from an electronic device (e.g., the electronic device 101) performing a call with the first external electronic device (e.g., the external electronic device 104) through the communication circuit while the call is performed between the electronic device (e.g., the electronic device 101) and the first external electronic device (e.g., the external electronic device 104), perform at least in part ASR and/or NLU on the voice input, and transmit a result of performing the ASR and/or NLU to the electronic device (e.g., the electronic device 101) and/or the first external electronic device (e.g., the external electronic device 104).

According to an embodiment, the instructions when executed by the processor 120 cause the server to control the communication circuit to transmit information indicating that the intelligent service is activated while the electronic device (e.g., the electronic device 101) performs the call with the first external electronic device (e.g., the external electronic device 104) to the first external electronic device (e.g., the external electronic device 104).

According to an embodiment, the instructions when executed by the processor 120 cause the server to, in response to the voice input including information related to inviting the first external electronic device (e.g., the external electronic device 104) to a predetermined network, control the communication circuit to transmit information for requesting to acknowledge the invitation to the network to the first external electronic device (e.g., the external electronic device 104).

The instructions when executed by the processor 120 cause the server to, in response to the voice input including information related to performing, by the user of the electronic device (e.g., the electronic device 101), an account transfer to the account of the user of the first external electronic device (e.g., the external electronic device 104), send a request for information related to performing the account transfer to the first external electronic device (e.g., the external electronic device 104) and, upon receiving the information related to performing the account transfer from the first external electronic device (e.g., the external electronic device 104) in response to the request, control the communication circuit to transmit the received information to a bank server (e.g., the banking service server 804) so that the account transfer corresponding to the voice input is performed based on the received information.

Figure 4:
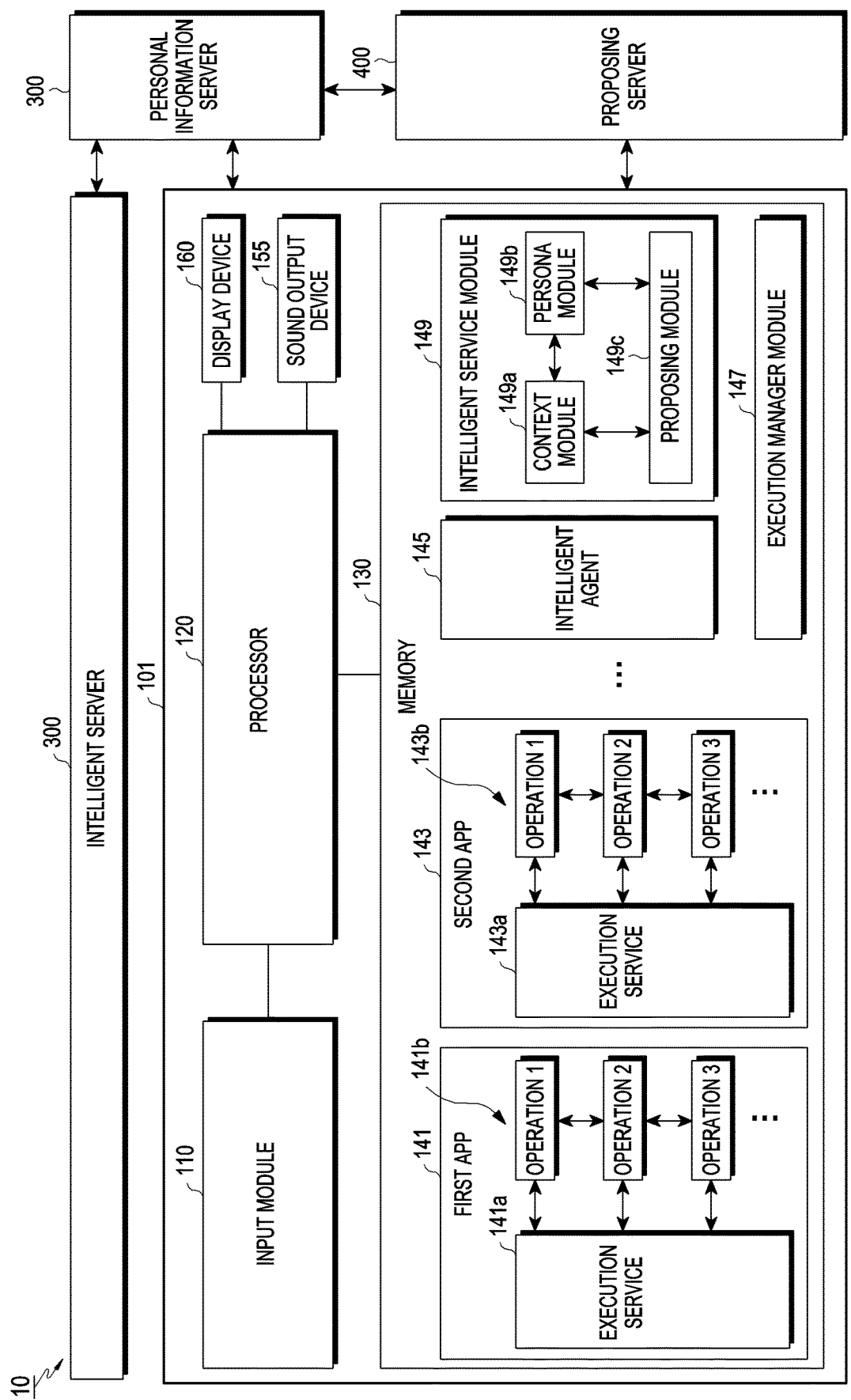
FIG. 4 is a block diagram illustrating an example configuration of an electronic device of an intelligent system according to an embodiment of the disclosure.

FIG. 4 is a block diagram illustrating an example configuration of an electronic device of an intelligent server according to an embodiment of the disclosure.

Referring to FIG. 4, an electronic device 101 (or the external electronic device 104) may include an input module (e.g., including input circuitry) 110 (e.g., the input device 150 of FIG. 1), a display device 160, a sound output device (e.g., including sound output circuitry) 155, a memory 130, and/or a processor (e.g., including processing circuitry) 120. The electronic device 101 may further include a housing. The components of the electronic device 101 may be disposed in or on the housing. The electronic device 101 may further include a communication circuit (e.g., the communication module 190 of FIG. 1) disposed inside the housing. The electronic device 101 may transmit and/or receive data (or information) to/from an external server (e.g., the intelligent server 200) through the communication circuit.

According to an embodiment of the disclosure, the input device 150 may include various input circuitry and receive a user input from the user. For example, the input device 150 may receive a user input from an external device (e.g., a keyboard or headset) connected thereto. As another example, the input device 150 may include, for example, and without limitation, a touchscreen combined with the display device 160 (e.g., a touchscreen display). As another example, the input device 150 may include, for example, and without limitation, a hardware key (or a physical key) positioned in the electronic device 101 (or the housing of the electronic device 101).

According to an embodiment of the disclosure, the input device 150 may include, for example, and without limitation, a microphone capable of receiving user utterances as voice signals. For example, the input device 150 may include, for example, and without limitation, a speech input system and receive user utterances as voice signals through the speech input system. The microphone may be exposed through, e.g., a portion (e.g., a first portion) of the housing.

According to an embodiment of the disclosure, the display device 160 may display, for example, and without limitation, images, videos, and/or application execution screens. For example, the display device 160 may display a graphic user interface (GUI) of an app. According to an embodiment, the display device 160 may be exposed through, e.g., a portion (e.g., a second portion) of the housing.

According to an embodiment of the disclosure, the sound output device 155 may include various sound output circuitry and output voice signals. For example, the sound output device 155 may output voice signals generated from inside the electronic device 101 to the outside. According to an embodiment, the sound output device 155 may be exposed through, e.g., a portion (e.g., a third portion) of the housing.

According to an embodiment of the disclosure, the memory 130 may store a plurality of apps (or application programs) 141 and 143. The plurality of apps 141 and 143 may be, e.g., programs for performing a function corresponding to a user input. According to an embodiment of the disclosure, the memory 130 may include the intelligent agent (e.g., including various executable program elements) 145, the execution manager module (e.g., including various executable program elements) 147, and/or the intelligent service module (e.g., including various executable program elements) 149. The intelligent agent 145, the execution manager module 147, and the intelligent service module 149 may be frameworks (or application frameworks) to process received user inputs (e.g., user utterances).

According to an embodiment of the disclosure, the memory 130 may include a database that may store information necessary to recognize user inputs. For example, the memory 130 may include a log database capable of storing log information. As another example, the memory 130 may include a persona database capable of storing user information.

According to an embodiment of the disclosure, the memory 130 may store the plurality of apps 141 and 143. The plurality of apps 141 and 143 may be loaded and operated. For example, the plurality of apps 141 and 143 stored in the memory 130 may be loaded and operated by the execution manager module 147. The plurality of apps 141 and 143 may include execution service modules 141*a* and 143*a* including, for example, various executable program elements configured to perform functions. According to an embodiment, the plurality of apps 141 and 143 may execute a plurality of operations (e.g., a sequence of states) 141*b* and 143*b* through the execution service modules 141*a* and 143*a* to perform functions. In other words, the execution service modules 141*a* and 143*a* may be activated by the execution manager module 147 and execute the plurality of operations 141*b* and 143*b*.

According to an embodiment of the disclosure, when the operations 141*b* and 143*b* of the apps 141 and 143 are executed, the execution state screens according to the execution of the operations 141*b* and 143*b* may be displayed on the display device 160. The execution state screens may be screens, e.g., in the state of the operations 141*b* and 143*b* having been completed. The execution state screens may be screens, e.g., in the state of the execution of the operations 141*b* and 143*b* having been stopped (partial landing) (e.g., when parameters required for the operations 141*b* and 143*b* are not input).

According to an embodiment of the disclosure, the execution service modules 141*a* and 143*a* may execute the operations 141*b* and 143*b* based on a path rule. For example, the execution service modules 141*a* and 143*a* may be activated by the execution manager module 147, receive an execution request based on the path rule from the execution manager module 147, and execute the operations 141*b* and 143*b* according to the execution request, thereby executing the functions of the apps 141 and 143. The execution service modules 141*a* and 143*a*, when the execution of the operations 141*b* and 143*b* is complete, may send completion information to the execution manager module 147.

According to an embodiment of the disclosure, when the plurality of operations 141*b* and 143*b* are executed on the apps 141 and 143, the plurality of operations 141*b* and 143*b* may sequentially be executed. When the execution of one operation (e.g., operation 1 of the first app 141 or operation 1 of the second app 143) is complete, the execution service modules 141*a* and 143*a* may open the next operation (e.g., operation 2 of the first app 141 or operation 2 of the second app 143) and send completion information to the execution manager module 147. For example, 'open an operation' may refer, for example, to transitioning the operation into an executable state or preparing for the execution of the operation. For example, unless the operation is open, the operation cannot be executed. Upon receiving the completion information, the execution manager module 147 may transfer an execution request for the next operation (e.g., operation 2 of the first app 141 or operation 2 of the second app 143) to the execution service module. According to an embodiment of the disclosure, when the plurality of apps 141 and 143 are executed, the plurality of apps 141 and 143 may sequentially be executed. For example, when the execution of the last operation of the first app 141 (e.g., operation 3 of the first app 141) is complete, and completion information is thus received, the execution manager module 147 may send an execution request for the first operation of the second app 143 (e.g., operation 1 of the second app 143) to the execution service module 143a.

According to an embodiment of the disclosure, when the plurality of operations 141b and 143b are executed on the apps 141 and 143, the resultant screens of execution of the plurality of operations 141b and 143b may be displayed on the display device 160. According to an embodiment of the disclosure, at least in part of the plurality of resultant screens according to execution of the plurality of operations 141b and 143b may be displayed on the display device 160.

According to an embodiment of the disclosure, the memory 130 may store an intelligent app (e.g., a speech recognition app) interworking with the intelligent agent 145. The app interworking with the intelligent agent 145 may receive and process a user utterance as a voice signal. According to an embodiment of the disclosure, the app interworking with the intelligent agent 145 may be operated by particular inputs (e.g., inputs through the hardware key or touchscreen, or particular voice inputs) obtained through the input device 150.

According to an embodiment of the disclosure, the intelligent agent 145, the execution manager module 147, and/or the intelligent service module 149 stored in the memory 130 may be executed by the processor 120. The functions of the intelligent agent 145, the execution manager module 147, and/or the intelligent service module 149 may be implemented by the processor 120. The functions of the intelligent agent 145, the execution manager module 147, and the intelligent service module 149 are described in connection with operations of the processor 120. According to an embodiment of the disclosure, the intelligent agent 145, the execution manager module 147, and/or the intelligent service module 149 stored in the memory 130 may be implemented, for example, and without limitation, in software or hardware or any combination thereof.

According to an embodiment of the disclosure, the processor 120 may include various processing circuitry and control the overall operation of the electronic device 101. For example, the processor 120 may control the input device 150 to receive user inputs. The processor 120 may control the display device 160 to display images. The processor 120 may control the sound output device 155 to output voice signals. The processor 120 may control the memory 130 to execute programs and fetch or store necessary information.

According to an embodiment of the disclosure, the processor 120 may execute the intelligent agent 145, the execution manager module 147, and/or the intelligent service module 149 stored in the memory 130. Thus, the processor 120 may implement the function of the intelligent agent 145, the execution manager module 147, and/or the intelligent service module 149.

According to an embodiment of the disclosure, the processor 120 may execute the intelligent agent 145 to generate commands to operate apps based on voice signals received as user inputs. According to an embodiment of the disclosure, the processor 120 may execute the execution manager module 147 to execute the apps 141 and 143 stored in the memory 130 based on the commands generated. According to an embodiment, the processor 120 may execute the intelligent service module 149 to manage the user information and process user inputs using the user information.

The processor 120 may execute the intelligent agent 145 to send user inputs received through the input device 150 to the intelligent server 200 and process the user inputs through the intelligent server 200.

According to an embodiment of the disclosure, the processor 120 may execute the intelligent agent 145 to pre-process the user inputs before sending the user inputs to the intelligent server 200. According to an embodiment of the disclosure, the intelligent agent 145 may include an adaptive echo canceller (AEC) module, a noise suppression (NS) module, an end-point detection (EPD) module, and/or an automatic gain control (AGC) module to pre-process the user inputs. The AEC module may include various executable program elements and remove echoes mixed in the user inputs. The NS module may include various executable program elements and suppress background noise mixed in the user inputs. The EPD module may include various executable program elements and detect end points of user voices contained in the user inputs to find when the user voices are present using the detected end points. The AGC module may include various executable program elements and recognize the user inputs and adjust the volume of the user inputs for a proper processing of the recognized user inputs. According to an embodiment of the disclosure, although able to execute all of the pre-processing components described above to provide a better performance, the processor 120 may execute some of the pre-processing components to be operated at reduced power.

According to an embodiment of the disclosure, the intelligent agent 145 may include a wake-up recognition module which may, for example, include various executable program elements stored in the memory 130 to recognize the user's invocation. Thus, the processor 120 may recognize the user's wake-up command through the wake-up recognition module, and upon receiving the wake-up command, the processor 120 may execute the intelligent agent 145 to receive user inputs. The wake-up recognition module may be implemented in a low-power processor (e.g., a processor included in an audio codec). According to an embodiment, the processor 120 may execute the intelligent agent 145 upon receiving a user input through the hardware key. When the intelligent agent 145 is executed, an intelligent app (e.g., a speech recognition app) interworking with the intelligent agent 145 may be executed.

According to an embodiment of the disclosure, the intelligent agent 145 may include a speech recognition module which may, for example, include various executable program elements, to execute user inputs. The processor 120 may receive user inputs to execute operations on the app through the speech recognition module. For example, the processor 120 may recognize, through the speech recognition module, limited user (voice) inputs (e.g., the "Click" sound made when the capturing operation is executed on the camera app) for executing operations, such as the wake-up command on the apps 141 and 143. The processor 120 may assist the intelligent server 200 in recognize and quickly process user commands, which are processable in the electronic device 101, through the speech recognition module. According to an embodiment, the speech recognition module of the intelligent agent 145 to execute user inputs may be implemented in an app processor.

According to an embodiment of the disclosure, the speech recognition module (including the speech recognition module of the wake-up recognition module) of the intelligent agent 145 may recognize user inputs using an algorithm for recognizing voice. The algorithm used to recognize voice may be, for example, and without limitation, at least one of, e.g., a hidden markov model (HMM) algorithm, an artificial neural network (ANN) algorithm, a dynamic time warping (DTW) algorithm, or the like.

According to an embodiment of the disclosure, the processor 120 may execute the intelligent agent 145 to convert the user's voice inputs into text data. For example, the processor 120 may send a user voice through the intelligent agent 145 to the intelligent server 200 and receive text data corresponding to the user voice from the intelligent server 200. Thus, the processor 120 may display the converted text data on the display device 160.

According to an embodiment of the disclosure, the processor 120 may execute the intelligent agent 145 to receive a path rule from the intelligent server 200. According to an embodiment, the processor 120 may transfer the path rule to the execution manager module 147 through the intelligent agent 145.

According to an embodiment of the disclosure, the processor 120 may execute the intelligent agent 145 to transfer an execution result log based on the path rule received from the intelligent server 200 to the intelligent service module 149. The execution result log transferred may be accrued and managed in user preference information of a persona manager 149b.

According to an embodiment of the disclosure, the processor 120 may execute the execution manager module 147 to receive the path rule from the intelligent agent 145, execute the apps 141 and 143, and allow the apps 141 and 143 to execute the operations 141b and 143b contained in the path rule. For example, the processor 120 may send command information (e.g., path rule information) to execute the operations 141b and 143b to the apps 141 and 143 through the execution manager module 147 and receive completion information about the operations 141b and 143b from the apps 141 and 143.

According to an embodiment of the disclosure, the processor 120 may execute the execution manager module 147 to transfer command information (e.g., path rule information) to execute the operations 141b and 143b of the apps 141 and 143 between the intelligent agent 145 and the apps 141 and 143. The processor 120 may bind the apps 141 and 143 to be executed based on the path rule through the execution manager module 147 and transfer the command information (e.g., path rule information) about the operations 141b and 143b contained in the path rule to the apps 141 and 143. For example, the processor 120 may sequentially transfer the operations 141b and 143b contained in the path rule to the apps 141 and 143 through the execution manager module 147, sequentially executing the operations 141b and 143b of the apps 141 and 143 based on the path rule.

According to an embodiment, the processor 120 may execute the execution manager module 147 to manage the execution states of the operations 141b and 143b of the apps 141 and 143. For example, the processor 120 may receive information about the execution states of the operations 141b and 143b from the apps 141 and 143 through the execution manager module 147. When the execution states of the operations 141b and 143b are, e.g., partial landing states (e.g., when no parameters required for the operations 141b and 143b are input), the processor 120 may transfer information about the partial landing states to the intelligent agent 145 through the execution manager module 147. The processor 120 may request the user to obtain necessary information (e.g., parameter information) using the information transferred through the intelligent agent 145. When the execution states of the operations 141b and 143b are other states, e.g., operation states, the processor 120 may receive an utterance from the user through the intelligent agent 145. The processor 120 may transfer information about the apps 141 and 143 being executed through the execution manager module 147 and the execution states of the apps 141 and 143 to the intelligent agent 145. The processor 120 may send the user utterance through the intelligent agent 145 to the intelligent server 200. The processor 120 may receive parameter information about the user utterance from the intelligent server 200 through the intelligent agent 145. The processor 120 may transfer the parameter information received through the intelligent agent 145 to the execution manager module 147. The execution manager module 147 may change the parameters of the operations 141b and 143b into new parameters using the received parameter information.

According to an embodiment, the processor 120 may execute the execution manager module 147 to transfer the parameter information contained in the path rule to the apps 141 and 143. When the plurality of apps 141 and 143 are sequentially executed based on the path rule, the execution manager module 147 may transfer the parameter information contained in the path rule from one app to the other.

According to an embodiment of the disclosure, the processor 120 may execute the execution manager module 147 to receive a plurality of path rules. The processor 120 may select a plurality of path rules based on the user utterance through the execution manager module 147. For example, when a user utterance specifies a certain app 141 to execute some operation 141a but does not specify another app 143 to execute the other operation 143b, the processor 120 may, through the execution manager module 147, receive a plurality of different path rules by which the same app 141 (e.g., gallery app) to execute the operation 141a is executed and a different app 143 (e.g., message app or telegram app) to execute the other operation 143b is executed. The processor 120 may execute the same operations 141b and 143b (e.g., the same continuous operations 141b and 143b) of the plurality of path rules through the execution manager module 147. When the same operations have been executed, the processor 120 may, through the execution manager module 120, display, on the display device 160, the state screen for selecting the different apps 141 and 143 each contained in a respective one of the plurality of path rules.

According to an embodiment of the disclosure, the intelligent service module 149 may include a context module (e.g., including various executable program elements) 149a, a persona module (e.g., including various executable program elements) 149b, and/or a proposing module (e.g., including various executable program elements) 149c.

The processor 120 may execute the context module 149a to identify current states of the apps 141 and 143 from the apps 141 and 143. For example, the processor 120 may execute the context module 149a to receive context information indicating the current states of the apps 141 and 143 to identify the current states of the apps 141 and 143 through the received context information.

The processor 120 may execute the persona module 149b to manage the personal information about the user using of the electronic device 101. For example, the processor 120 may execute the persona module 149b to obtain use information and execution results of the electronic device 101 and manage the user's personal information using the obtained use information and execution results of the electronic device 101.

The processor 120 may execute the proposing module 149c to predict the user's intention and recommend a command for the user based on the user's intention. For example, the processor 120 may execute the proposing module 149c to recommend a command for the user based on the user's current state (e.g., time, place, context, or app).

According to an embodiment of the disclosure, an electronic device (e.g., the electronic device 101) comprises at least one communication circuit (e.g., the communication module 190), a speaker (e.g., the sound output device 155), a microphone 111, at least one processor (e.g., a processor 120) operatively connected with the communication circuit, the speaker, and the microphone, and a memory 130 operatively connected with the processor 120, wherein the memory 130 stores instructions which, when executed by the processor 120, cause the electronic device to perform a call with a first external electronic device (e.g., the electronic device 104) through the communication circuit, activate a voice-based intelligent service while the call is performed, identify a user's voice input through the microphone while the call is performed, and transmit data associated with the voice input to an external server (e.g., the intelligent server 200) through the communication circuit at least partially for automatic speech recognition (ASR) and/or natural language understanding (NLU).

According to an embodiment, the instructions when executed by the processor 120 cause the electronic device to activate the intelligent service in response to receiving a voice input including a predetermined word or a predetermined input while the call is performed.

According to an embodiment, the instructions when executed by the processor 120 cause the electronic device to control a display to display information indicating that the intelligent service is activated while the call is performed and control the communication circuit to transmit the information to the first external electronic device (e.g., the electronic device 104).

According to an embodiment of the disclosure, the instructions when executed by the processor 120 cause the electronic device to, when the voice input includes information related to inviting the first external electronic device (e.g., the electronic device 104) to a predetermined network, control the communication circuit to transmit information for requesting to acknowledge the invitation to the network to the first external electronic device (e.g., the external electronic device 104).

According to an embodiment of the disclosure, the instructions when executed by the processor 120 cause the electronic device to, when the voice input includes information related to controlling at least one electronic device (e.g., home appliances or IoT devices) controlled by the first external electronic device (e.g., the electronic device 104) connected through a network, control the communication circuit (e.g., the communication module 190) to transmit a request to authorize the control of the at least one electronic device to the first external electronic device (e.g., the electronic device 104) while the call is performed.

According to an embodiment of the disclosure, the instructions when executed by the processor 120 cause the electronic device to, when the voice input includes information related to performing account transfer to an account of a user of the first external electronic device (e.g., the electronic device 104), control the communication circuit (e.g., the communication module 190) to send a request for information related to the account transfer to the first external electronic device (e.g., the external electronic device 104).

According to an embodiment of the disclosure, the instructions when executed by the processor 120 cause the electronic device to receive the account transfer-related information from at least one second external electronic device (e.g., the electronic device 102), perform authentication to determine whether a user of the electronic device corresponds to pre-determined user information, and control the communication circuit (e.g., the communication module 190) to transmit, to the external server, the account transfer-related information received while the call is performed according to a result of the authentication.

According to an embodiment of the disclosure, the instructions when executed by the processor 120 cause the electronic device to identify, based on a user input, password information or biometric information and determine whether the password information or the biometric information corresponds to pre-stored information to authenticate the user. The biometric information may include, for example, and without limitation, iris information, voice pattern information, fingerprint information, or the like.

Figure 5:
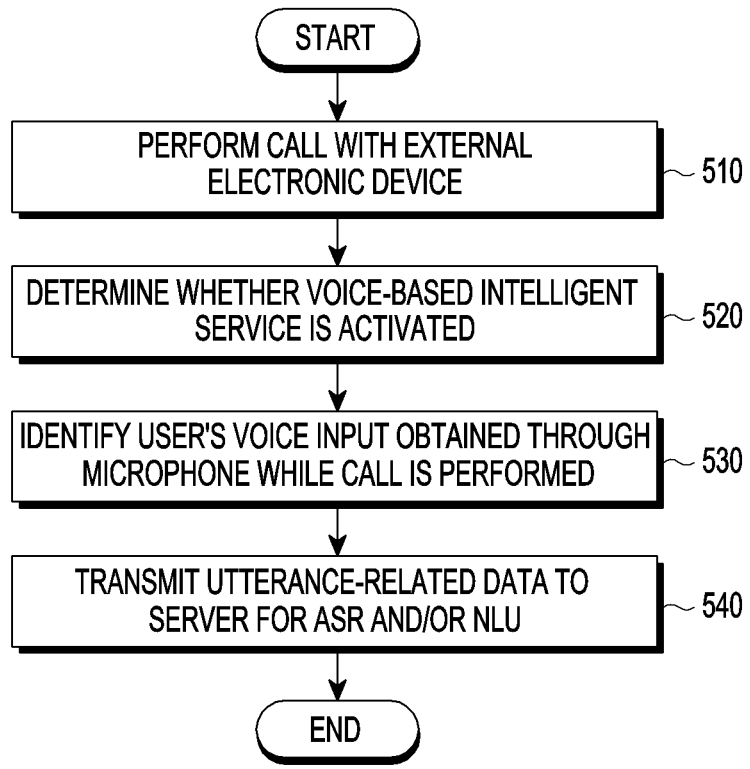
FIG. 5 is a flowchart illustrating example operations of an electronic device providing an intelligent service based on an utterance between users who perform a call according to an embodiment of the disclosure.

FIG. 5 is a flowchart illustrating example operations of an electronic device providing an intelligent service based on an utterance between users on a call according to an embodiment of the disclosure.

Referring to FIG. 5, in operation 510, an electronic device (e.g., the electronic device 101) may be on call with an external electronic device (e.g., the electronic device 104).

In operation 520, the electronic device may determine whether a voice-based intelligent service is activated. For example, in response to obtaining a voice input containing a predetermined word or a predetermined input (e.g., a key input) while the call is being performed, the electronic device may control to activate the intelligent service.

In operation 530, when the intelligent service is activated, the electronic device may identify the user's voice input obtained through a microphone of the electronic device while performing the call.

According to an embodiment, the electronic device may display information indicating that the intelligent service is activated while performing the call and transmit the information to the external electronic device. For example, upon determining that the external electronic device may support the intelligent service, the electronic device may transmit the information to the external electronic device.

In operation 540, the electronic device may transmit data related to utterance for natural language understanding and/or speech recognition to a server. For example, the electronic device may transmit the voice input-related data to an external server (e.g., the intelligent server 200), at least partially, for automatic speech recognition (ASR) and/or natural language understanding (NLU).

According to an embodiment, when the voice input contains information related to inviting a first external electronic device (e.g., the electronic device 104) to a predetermined network, the electronic device 101 may transmit information to request to identify the invitation to the network to the first external electronic device.

According to an embodiment of the disclosure, when the voice input includes information related to controlling at least one second external electronic device (e.g., the electronic device 102 of FIG. 1) controlled by the first external electronic device 104 connected through a network, the electronic device 101 may transmit a request to authorize control of the at least one second external electronic device 102 to the first external electronic device 104 while the call is performed.

According to an embodiment of the disclosure, when the voice input includes information related to performing an account transfer to the account of the user of the first external electronic device 104, the electronic device 101 may send a request for the account transfer to the first external electronic device 104.

According to an embodiment of the disclosure, the electronic device may receive the account transfer-related information from at least one second external electronic device (e.g., the electronic device 102 of FIG. 1), authenticate the user of the electronic device to determine whether the user of the electronic device corresponds to predetermined user information, and transmit, to the external server, the account transfer-related information received while the call is performed according to a result of the authentication.

According to an embodiment of the disclosure, the electronic device 101 may request the user of the electronic device 101 to obtain biometric information and/or password information and determine whether the biometric information and/or password information obtained in response to the request corresponds to pre-stored information to authenticate the user. The biometric information may include, for example, and without limitation, iris information, voice pattern information, fingerprint information, or the like.

Figure 6:
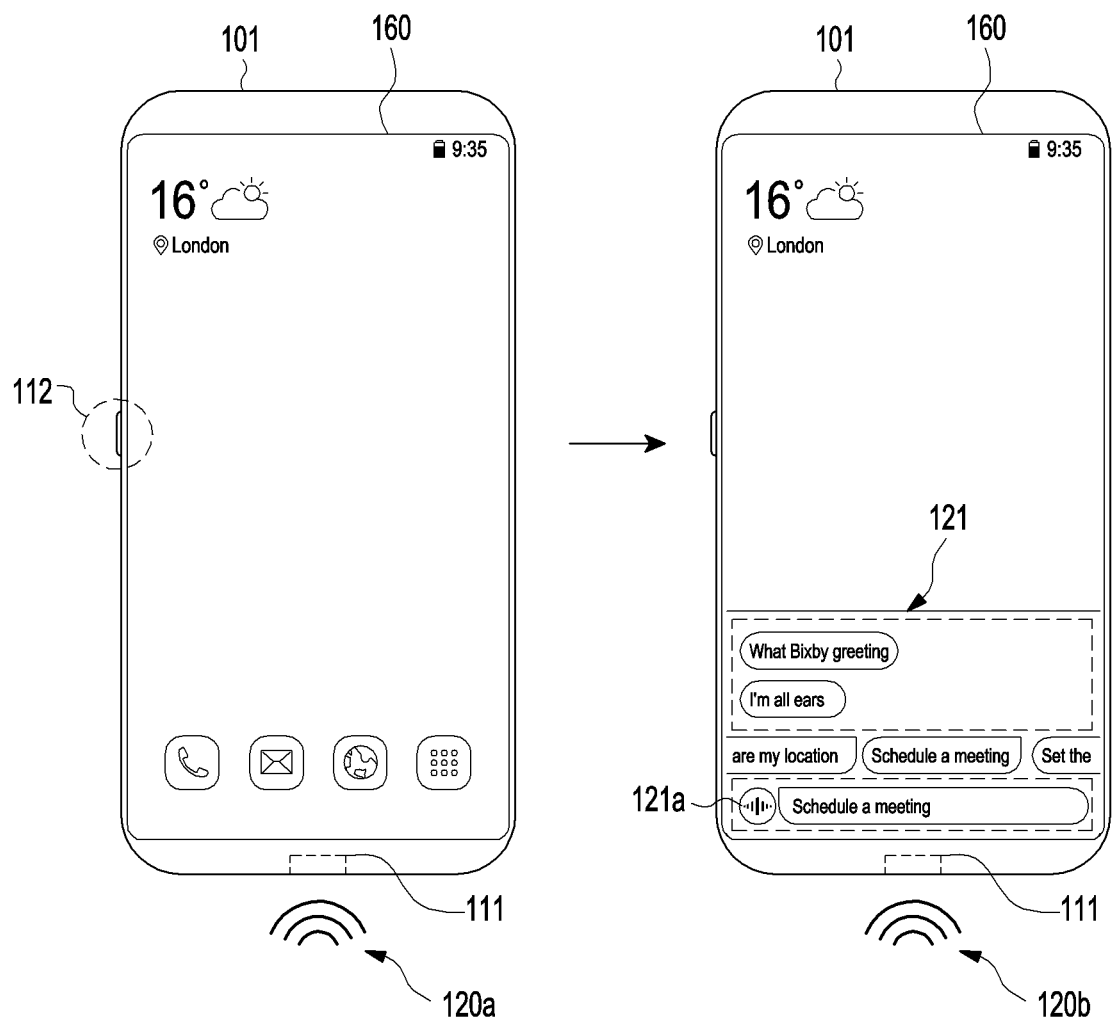
FIG. 6 is a diagram illustrating an example of executing an intelligence app on a user terminal according to an embodiment of the disclosure.

FIG. 6 is a diagram illustrating an example of executing an intelligence app on a user terminal according to an embodiment of the disclosure.

FIG. 6 illustrates an example in which the electronic device 101 receives user inputs and executes an intelligent app (e.g., a speech recognition app) interworking with the intelligent agent 145.

According to an embodiment of the disclosure, the electronic device 101 may execute an intelligent app to recognize voice through, for example, the hardware key 112. For example, when the electronic device 101 receives user inputs through the hardware key 112, the electronic device 101 may display a user interface (UI) 121 for the intelligent app on the display device 160. The user may touch a speech recognition button 121*a* in the UI 121 of the intelligent app for inputting voice 120*b* with the intelligent app UI 121 displayed on the display device 160. As another example, the user may continuously press the hardware key 112 for inputting voice 120*b*.

According to an embodiment of the disclosure, the electronic device 101 may execute an intelligent app to recognize voice through the microphone 111. For example, when a predetermined voice (e.g., "wake up!" or "Bixby!") is input (120*a*) through the microphone 111, the electronic device 101 may display the intelligent app UI 121 on the display device 160.

Figure 7:
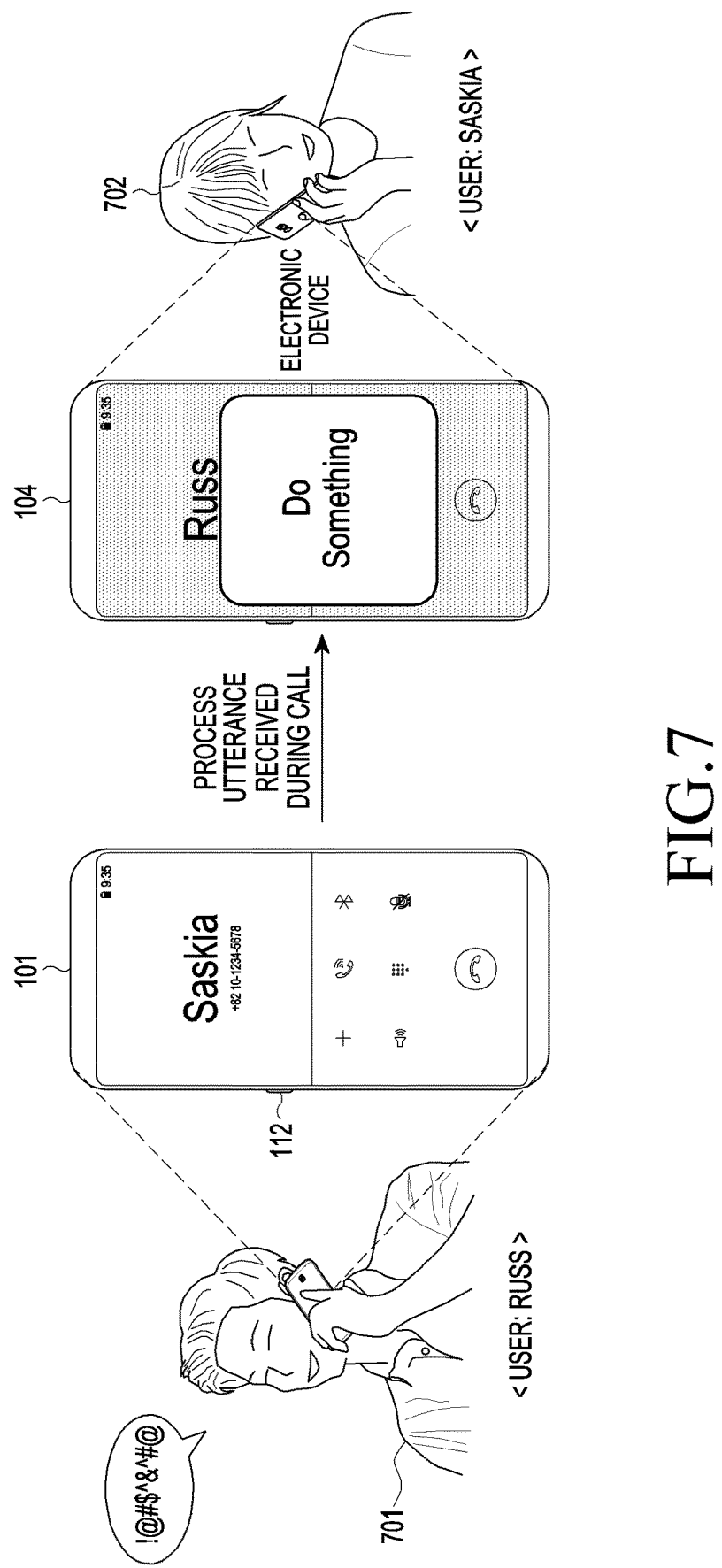
FIG. 7 is a diagram illustrating an example of performing an intelligent service by an utterance received during a call between users in an intelligent system according to an embodiment of the disclosure.

FIG. 7 is a diagram illustrating an example of performing an intelligent service by an utterance received during a call between users in an intelligent system according to an embodiment of the disclosure.

Referring to FIG. 7, an intelligent system may include an electronic device 101 of a first user (e.g., 'Russ') 701 and an external electronic device 104 of a second user (e.g., 'Saskia') 702.

According to an embodiment, when a predetermined input is received through at least one of the electronic devices 101 and 104 while a call is being performed between the electronic devices 101 and 104, an intelligent service may be activated on the electronic devices 101 and 104. For example, the predetermined input may include a predetermined voice (e.g., "Wake up!"), a voice (e.g., "Bixby!") to call the name of the intelligent service, a designated hardware input (e.g., selecting the button 112), reception of designated data (e.g., a sensor value), or a designated action (e.g., a gesture). The intelligent service may be activated based on other various types of inputs determinable by the electronic device 101 or 104.

According to an embodiment, as the intelligent service is activated on the electronic devices 101 and 104, the electronic devices 101 and 104 may be connected to the intelligent server 200, and each electronic device may output a notification to indicate that the intelligent service is activated. For example, after the intelligent service is activated, an utterance received to each electronic device may be transmitted to the intelligent server 200, and the intelligent server 200 may identify a function related to the received utterance.

According to an embodiment, when the utterance contains information indicating a function (e.g., a call recording or memo) related to the call, the intelligent server 200 may control the electronic devices 101 and 104, which are performing the call, to perform the function related to the utterance and display a result of performing the function.

According to an embodiment, the intelligent server 200 may determine whether to provide the function (e.g., keyword search) related to the utterance received to the electronic devices 101 and 104 performing the call to both or a particular one of the electronic devices 101 and 104. For example, when the utterance does not contain information indicating the other party of the call, the intelligent server 200 may perform control so that the function related to the utterance is provided only to the electronic device of the user who has input the utterance.

According to an embodiment, in response to inputting a voice or receiving an input to activate an intelligent service while the call is being performed, the electronic device may provide the intelligent service based on the received voice.

Figure 8:
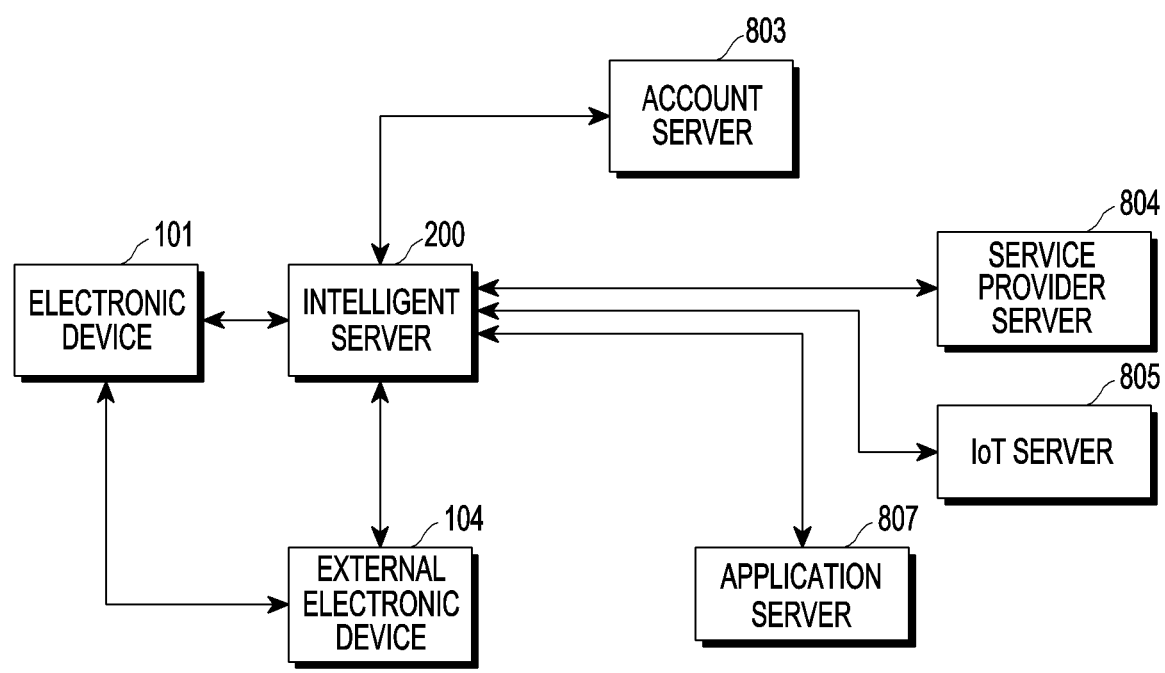
FIG. 8 is a block diagram illustrating an example configuration of an integrated intelligent system according to an embodiment of the disclosure.

FIG. 8 is a diagram illustrating an example configuration of an integrated intelligent system according to an embodiment of the disclosure.

Referring to FIG. 8, an intelligent system may include at least two electronic devices (e.g., 101 and 104) performing a call and an intelligent server 200, and the intelligent system may further include, for example, and without limitation, at least one of an account server 803, a service provider server 804 (e.g., a bank service server), an Internet-of-things (IoT) server 805, and/or an application server 807.

According to an embodiment, when an intelligent service is activated while the electronic devices (e.g., 101 and 104) are performing a call, the intelligent server 200 may identify an utterance received during the call is being performed between the electronic devices (e.g., 101 and 104). For example, the intelligent server 200 may transmit the utterance to at least one of the account server 803, the service provider server 804, the IoT server 805, and/or the application server 807 to identify a function or service providable to the electronic devices (e.g., 101 and 104) in relation to the utterance.

According to an embodiment of the disclosure, although the servers (e.g., the account server 803, the service provider server 804, the IoT server 805, and/or the application server 807) are depicted as a separate component from the intelligent server 200, at least some of the servers may be omitted or modified, and the intelligent server 200 may be configured to perform some of the functions of the servers.

The account server 803 may manage and store account information about electronic devices accessing various networks (e.g., Samsung Connect™, SmartThings™, Samsung Smart Home™, etc.). For example, the account server 803 may identify information received from a particular electronic device (e.g., 101 or 104), determine whether the identified information corresponds to designated information, and control to allow the electronic device to access a particular network.

According to an embodiment, an intelligent service may be activated while the electronic device 101 is performing a call with the external electronic device 104, and such a voice as "Invite Saskia to Samsung Connect!") may be input. By identifying the voice (e.g., "Samsung Connect") indicating the particular network and the voice (e.g., "Invite Saskia") indicating the function related to the service of the network, the intelligent server 200 may request the account server 803 to identify whether the electronic devices of the users related to the utterance may access the particular network. The service provider server 804 may provide various banking services using user account information and authentication information about an electronic device (e.g., 101 or 104). For example, the banking services may include the service of transferring money to another user's account.

According to an embodiment of the disclosure, an intelligent service may be activated while the electronic device 101 is performing a call with the external electronic device 104, and a voice (e.g., "What's your account number?" "Transfer 10,000 KRW!") related to a banking service may be received. By identifying the voice indicating the banking service from the utterance, the intelligent server 200 may request the service provider server 803, which supports the banking service, to provide the utterance-related function (e.g., send 10,000 KRW to Saskia).

The IoT server 805 may control connections among home appliances constituting a home network and enable a particular electronic device (e.g., 101 or 104) to control the functions of the home appliances.

The application server 807 may control applications installed on the electronic device (e.g., 101 or 104).

Figure 9:
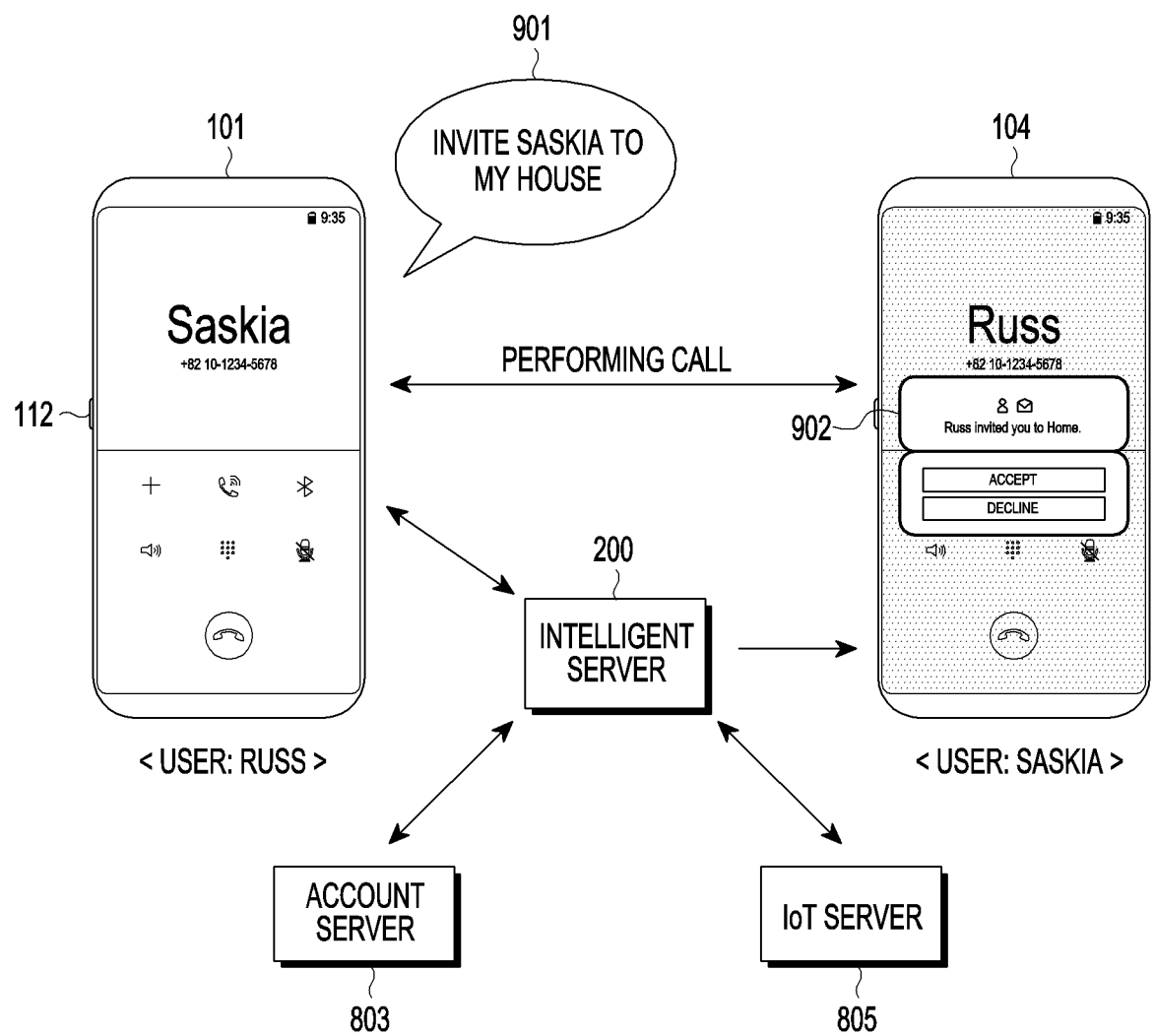
FIG. 9 is a diagram illustrating an example of performing an intelligent service by an utterance received during a call between users in an intelligent system according to an embodiment of the disclosure.

FIG. 9 is a diagram illustrating an example of performing an intelligent service by an utterance received during a call between users in an intelligent system according to an embodiment of the disclosure.

Referring to FIG. 9, an intelligent system may include at least two electronic devices (e.g., 101 and 104) performing a call, an intelligent server 200, an account server 803, or an IoT server 805.

According to an embodiment, the user (e.g., "Russ") of the electronic device 101 and the user (e.g., "Saskia") of the external electronic device 104 may be performing a call and, as a particular one of the electronic devices identifies a predesignated utterance or a selection of a designated button 112, an intelligent service may be activated on the electronic devices.

According to an embodiment, the utterance 901 received through at least one of the electronic devices may be transmitted to the intelligent server 200 and, to provide a service corresponding to the utterance 901, the intelligent server 200 may send a request for a service related to the utterance 901 to at least one server (e.g., the account server 803 or the IoT server 805). For example, the utterance 901 may be to make a request for control to allow the other party (e.g., the external electronic device 104) to approach a particular network and may include "Invite Saskia (e.g., the user of the external electronic device 104) to my house."

According to an embodiment of the disclosure, the intelligent server 200 may provide a service for the other party's connection to the account server 803, which controls connection to the network related to the utterance 901, or the IoT server 805, which controls at least one electronic device (e.g., home applications) included in the network, and for controlling the electronic devices in the network.

According to an embodiment of the disclosure, in response to the utterance 901, the intelligent server 200 may transmit information indicating that an invitation to the network has been made by the user (e.g., Russ) of the electronic device 101 to the external electronic device 104, and the external electronic device 104 may display a message 902 including the information and at least one item (e.g., accept or decline) to allow the second user to select a response to the information.

Figure 10:
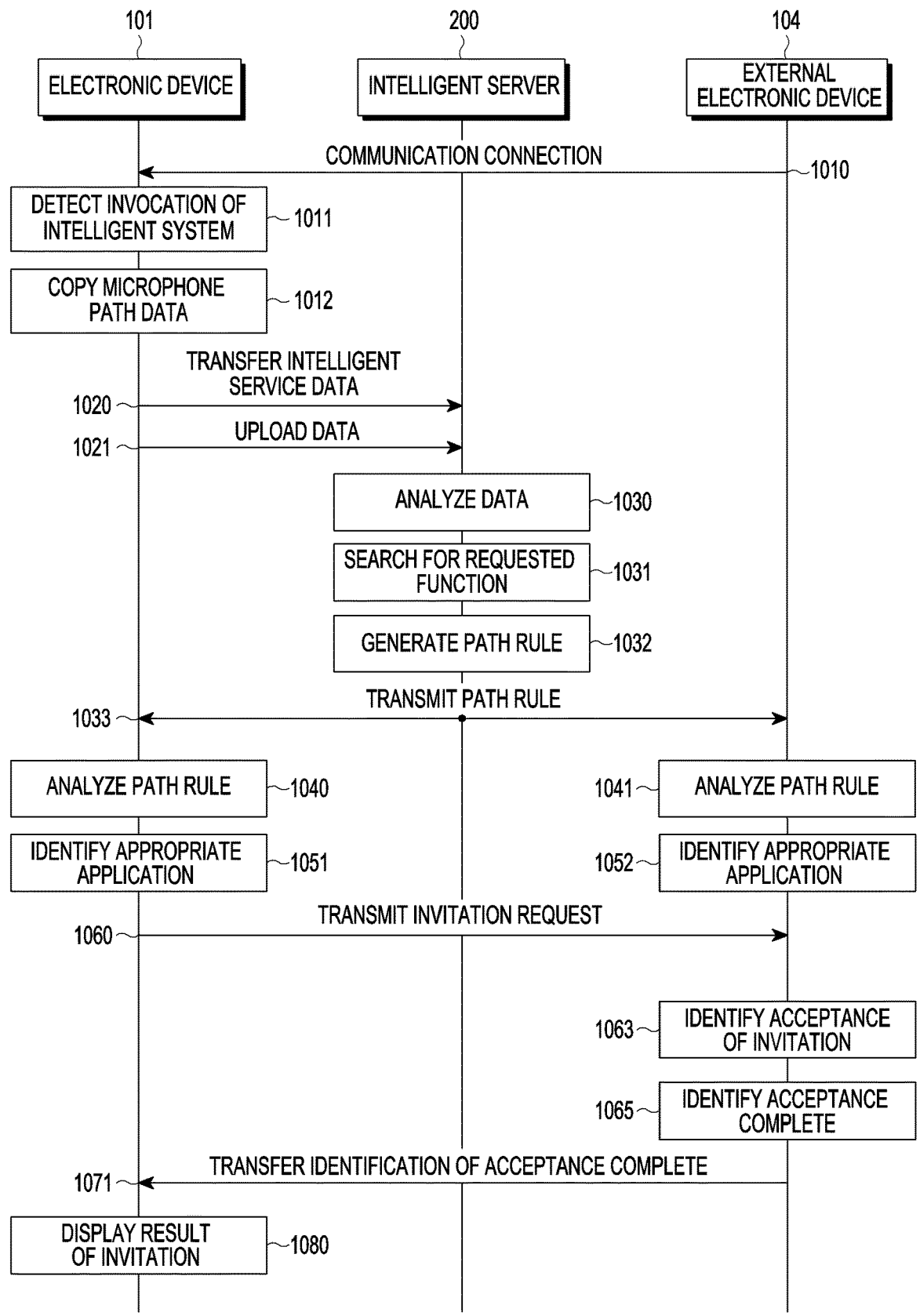
FIG. 10 is a flowchart illustrating example operations of an electronic device and server providing an intelligent service based on an utterance between users who perform a call according to an embodiment of the disclosure.

FIG. 10 is a flowchart illustrating example operations of an electronic device and server providing an intelligent service based on an utterance between users who perform a call according to an embodiment of the disclosure.

Referring to FIG. 10, an intelligent system may include at least two electronic devices (e.g., 101 and 104) performing a call and/or an intelligent server 200.

In operation 1010, the electronic device 101 and the external electronic device 104 may perform a call.

In operation 1011, the electronic device 101 may detect a reception of an invocation to activate the intelligent system. For example, the invocation may include a voice including designated words or selection of a designated button.

According to an embodiment, as the intelligent system is activated on the electronic device 101, the external electronic device 104 which is performing the call with the electronic device 101, may output a notification to indicate that the intelligent service is provided or a message to inquire whether the intelligent service is activated based on a later utterance received.

In operation 1012, the electronic device 101 may copy microphone path data. For example, the microphone path data may include voice data obtained through the microphone 111 of the electronic device 101.

In operation 1020, the electronic device 101 may transfer intelligent service data to the intelligent server 200. For example, the intelligent service data may include at least part of voice data obtained during the electronic device 101 is performing the call with the external electronic device 104 after the intelligent service is activated among the microphone path data.

In operation 1021, the electronic device 101 may transmit (e.g., upload) intelligent service data (e.g., voice data) to the intelligent server 200.

According to an embodiment, the transmitted data may include the voice data "Invite Saskia (the user of the external electronic device 104) to Bixby home!" to allow the electronic device 101 to invite the external electronic device 104 to a particular network.

In operation 1030, the intelligent server 200 may analyze the intelligent service data transferred from the electronic device 101.

In operation 1031, the intelligent server 200 may search for a function requested by the electronic device 101 based on the analyzed data.

In operation 1032, the intelligent server 200 may generate a path rule to perform the requested function. For example, the path rule may include the function of transmitting a message to request an invitation to access a network to the external electronic device 104 to configure the network with the external electronic device 104 and to allow the external electronic device 104 to control at least one device (e.g., home appliances) in the network.

In operation 1033, the intelligent server 200 may transmit the generated path rule to the electronic device 101 and the external electronic device 104.

In operation 1040, the electronic device 101 may analyze the path rule.

In operation 1041, the external electronic device 104 may analyze the path rule.

In operation 1051, the electronic device 101 may identify an application appropriate for performing operations included in the path rule among applications installed on the electronic device 101 based on the information contained in the analyzed path rule.

In operation 1052, the external electronic device 104 may identify an application appropriate for performing operations included in the path rule among applications installed on the external electronic device 104 based on the information contained in the analyzed path rule.

In operation 1060, the electronic device 101 may transmit an invitation request to the external electronic device 104 via the identified application. For example, the invitation request may be transmitted in the form of a message (e.g., a short message service (SMS) or push message) via the IoT server 805 or the application server 807.

In operation 1063, the external electronic device 104 may identify the invitation request received from the electronic device 101 through the identified application and identify whether the user of the external electronic device 104 accepts the invitation request.

In operation 1065, the external electronic device 104 may identify that the user has accepted the invitation request. For example, the external electronic device 104 may identify whether the user has accepted the invitation request based on the user's voice input or the user's input responsive to the message indicating the invitation request which is displayed in the form of a message.

In operation 1071, the external electronic device 104 may transfer a message indicating that the invitation request has been accepted to the electronic device 101. For example, the external electronic device 104 may transmit a message to acknowledge the acceptance of the invitation request to the electronic device 101 directly or via a server (e.g., the IoT server 805 or the application server 807).

In operation 1080, the electronic device 101 may display a result of the invitation request. For example, the result may be output through a speaker (e.g., the sound output device 155) or a display (e.g., the display device 160) in various forms (e.g., a voice, vibration, or message).

Figure 11:
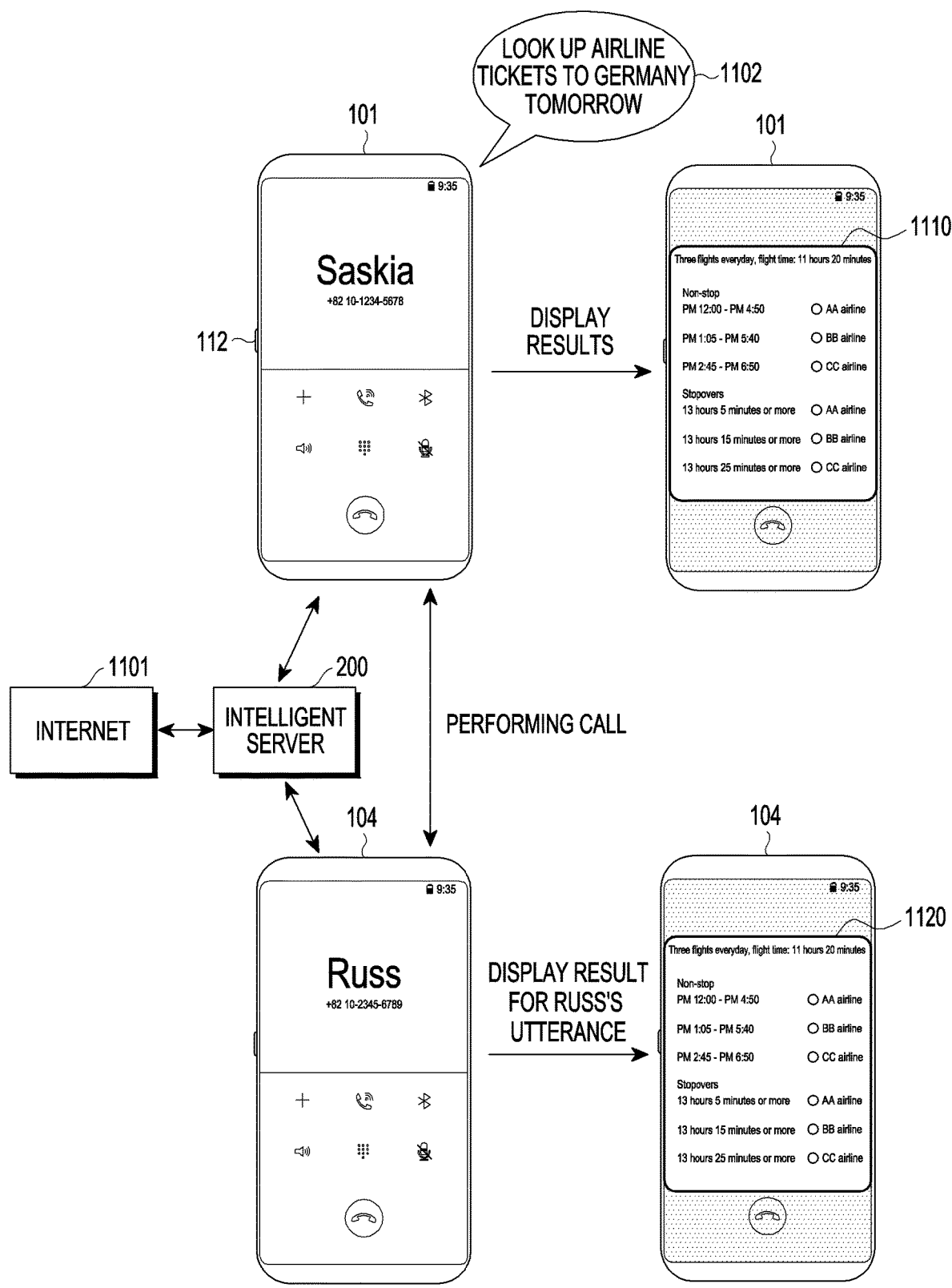
FIG. 11 is a diagram illustrating an example of performing an intelligent service by an utterance received during a call between users in an intelligent system according to an embodiment of the disclosure.

FIG. 11 is a diagram illustrating an example of performing an intelligent service by an utterance received during a call between users in an intelligent system according to an embodiment of the disclosure.

Referring to FIG. 11, an intelligent system may include at least two electronic devices (e.g., 101 and 104) performing a call or an intelligent server 200. For example, the intelligent server 200 may perform a search function on the Internet 1101, providing an intelligent service.

According to an embodiment, the user (e.g., "Russ") of the electronic device 101 and the user (e.g., "Saskia") of the external electronic device 104 may be performing a call and, as a predesignated input (e.g., a button (112) input) is identified on the electronic device 101, an intelligent service may be activated on the electronic device 101 or the external electronic device 104.

According to an embodiment, after the intelligent service is activated and when a first utterance 1102 of a first user 701 (see, e.g., FIG. 7) is received through the electronic device 101, the electronic device 101 may transmit the first utterance 1102 to the intelligent server 200. For example, the first utterance 1102 may include "Look up airline tickets to Germany tomorrow!" to obtain information about an airline ticket to Germany.

According to an embodiment, the intelligent server 200 may identify keywords (e.g., 'tomorrow,' 'Germany,' or 'airline ticket') contained in the first utterance 1102 or a command-related word (e.g., 'Look up') and perform an operation corresponding to the command. For example, the intelligent server 200 may search the Internet 1101 for information about airline tickets for departing to Germany on the next day in response to the first utterance 1102.

According to an embodiment, upon failure to search the intelligent server 200 for information related to a keyword contained in the voice input of the first user 701, the intelligent server 200 may search the Internet 1101 for the information.

According to an embodiment, when the first utterance 1102 further includes a command for transmission to the other party, the intelligent service 200 may identify an electronic device (e.g., an external electronic device) related to the first utterance 1102. The first utterance 1102 may further contain "Share the result with (Saskia)!" For example, the intelligent server 200 may determine whether the first utterance 1102 includes a voice (e.g., 'Saskia') indicating the second user of the external electronic device 104 which is on a call with the electronic device 101, determining that the first utterance 1102 is related to the external electronic device 104.

According to an embodiment, the intelligent server 200 may transmit information indicating the search result for 'airline ticket to Germany' to the electronic device 101 and the external electronic device 104 related to the first utterance 1102 in response to the first utterance 1102. For example, the electronic device 101 and the external electronic device 104 may display the search result based on an intelligent service. The screen 1110 and/or 1120 displaying the search result may include such information as flight time, non-stop flights, or stopover flights as information related to the 'airline ticket to Germany.'

According to an embodiment, unless the first utterance 1102 contains a voice (e.g., 'Saskia') indicating the second user 702, the intelligent server 200 may determine that the first utterance 1102 is unrelated with the external electronic device 104. For example, the intelligent server 200 may transmit the search result for the first utterance 1102 to the electronic device 101, and the electronic device 101 may keep the intelligent service active and maintain the call connection with the external electronic device 104.

According to an embodiment, the intelligent system may transmit a response to the utterance only to a particular user depending on whether the utterance contains a voice indicating the other party to the call and provide an intelligent service that may maintain the call seamlessly.

Figure 12:
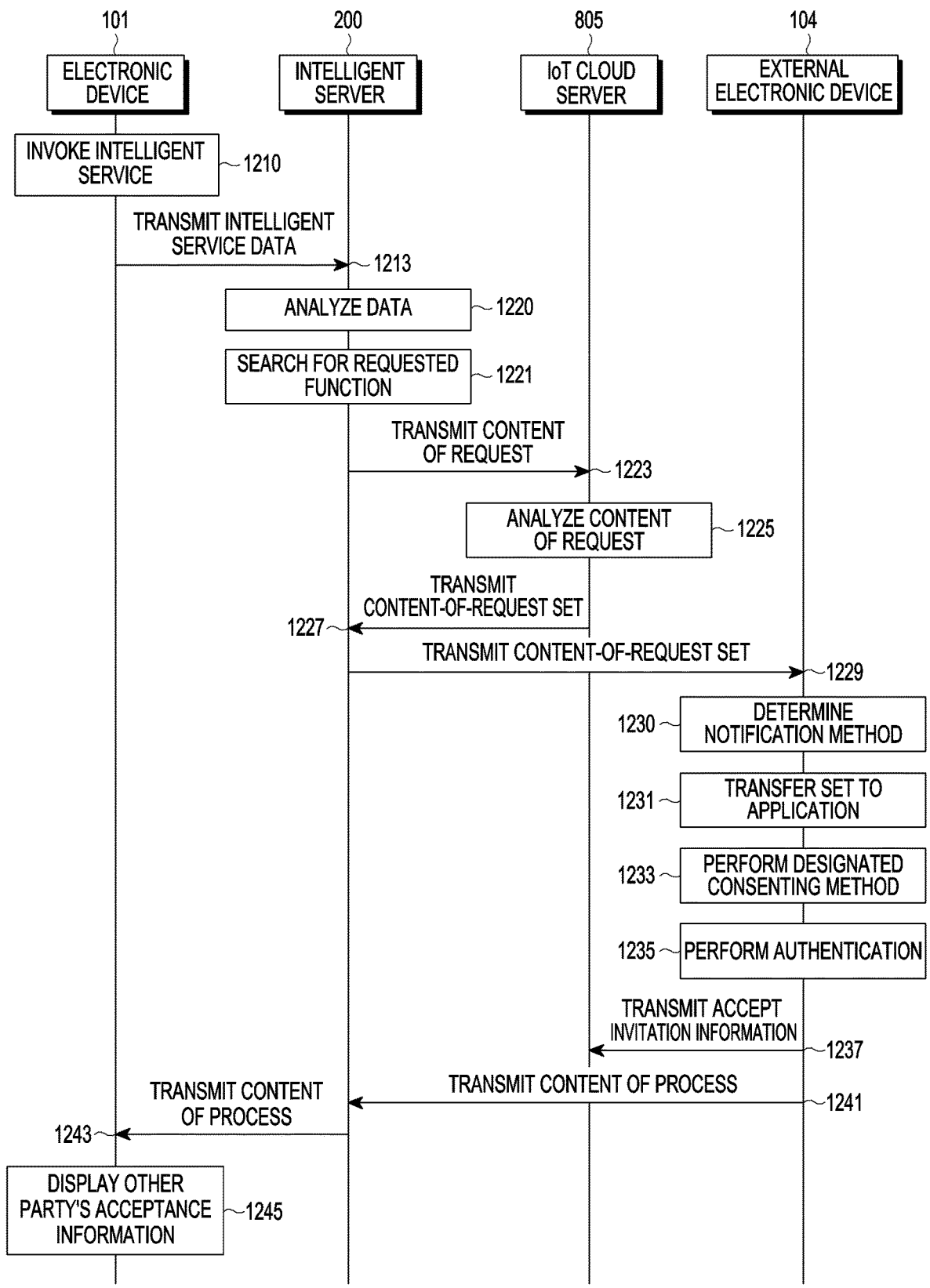
FIG. 12 is a flowchart illustrating example operations of an electronic device and server providing an intelligent service based on an utterance between users who perform a call according to an embodiment of the disclosure.

FIG. 12 is a flowchart illustrating example operations of an electronic device and server providing an intelligent service based on an utterance between users who perform a call according to an embodiment of the disclosure.

Referring to FIG. 12, an intelligent system may include at least two electronic devices (e.g., 101 and 104) performing a call, an intelligent server 200, and an IoT cloud server 805.

In operation 1210, the electronic device 101 may detect an input of an invocation to activate the intelligent system. For example, the invocation may include a voice constituted of designated words or selection of a designated button.

According to an embodiment, as the intelligent system is activated on the electronic device 101, the external electronic device 104 which is performing the call with the electronic device 101, may output a notification to indicate that the intelligent service is provided or a message to inquire whether the intelligent service is activated based on a later utterance received. For example, only when a response to the output message is positive, an intelligent service may be provided and, when the response is negative, an intelligent service may be terminated.

In operation 1213, the electronic device 101 may transfer intelligent service data to the intelligent server 200. For example, the intelligent service data may include a voice input during the electronic device 101 is performing the call with the external electronic device 104 after the intelligent service is activated.

In operation 1220, the intelligent server 200 may analyze the intelligent service data transferred from the electronic device 101.

In operation 1221, the intelligent server 200 may search for a function requested by the electronic device 101 based on the analyzed data.

In operation 1223, the intelligent server 200 may transmit content related to the requested function to the IoT cloud server 805.

In operation 1225, the IoT cloud server 805 may analyze request content.

In operation 1227, the IoT cloud server 805 may transmit a set of request content to the intelligent server 200. For example, the set of request content may include application or task information executed in relation to the intelligent service data.

In operation 1229, the intelligent server 200 may transmit the received set of request content to the external electronic device 104.

In operation 1230, the external electronic device 104 may identify the set of request content and determine a notification method. The notification method may include a method of displaying on a display (e.g., the display device 160) in the form of a message or a method of outputting via a speaker (e.g., the sound output device 155) in the form of voice data. For example, upon identifying that the external electronic device 104 is performing a call with another electronic device (e.g., the electronic device 101), such control may be performed as to display the set of request content on a display (e.g., the display device 160) in the form of a message.

In operation 1231, the external electronic device 104 may transfer the set of request content to an appropriate application. For example, as the set of request content is transferred, the external electronic device 104 may execute the application to which the set has been transferred and perform a particular task of the application.

In operation 1233, the external electronic device 104 may perform a designated consenting method to identify whether the user accepts the request content. For example, the consenting method may include outputting data (e.g., a message or voice) to inquire whether to perform the request content and identify the user's input (e.g., a designated voice or touch input) for the data.

In operation 1235, the external electronic device 104 may perform authentication on the user of the external electronic device 104. For example, the external electronic device 104 may receive biometric information (e.g., voice pattern, fingerprint, iris, etc.) about the user and perform authentication depending on whether the received information corresponds to pre-identified information.

In operation 1237, the external electronic device 104 may transmit information to indicate that the user of the external electronic device 104 has accepted the request to, e.g., the IoT cloud server 805. For example, the external electronic device 104 may identify whether the user has accepted the invitation request based on the user's voice input or the user's input responsive to the message indicating the invitation request which is displayed in the form of a message.

In operation 1241, the external electronic device 104 may transmit the content of the processes of identifying the user's acceptance of the request and performing the authentication to the intelligent server 200.

In operation 1243, the intelligent server 200 may transmit the received content of process to the electronic device 101.

In operation 1245, the electronic device 101 may display the accept information for the request of the other party (e.g., the external electronic device 104) based on the received content of process.

Figure 13:
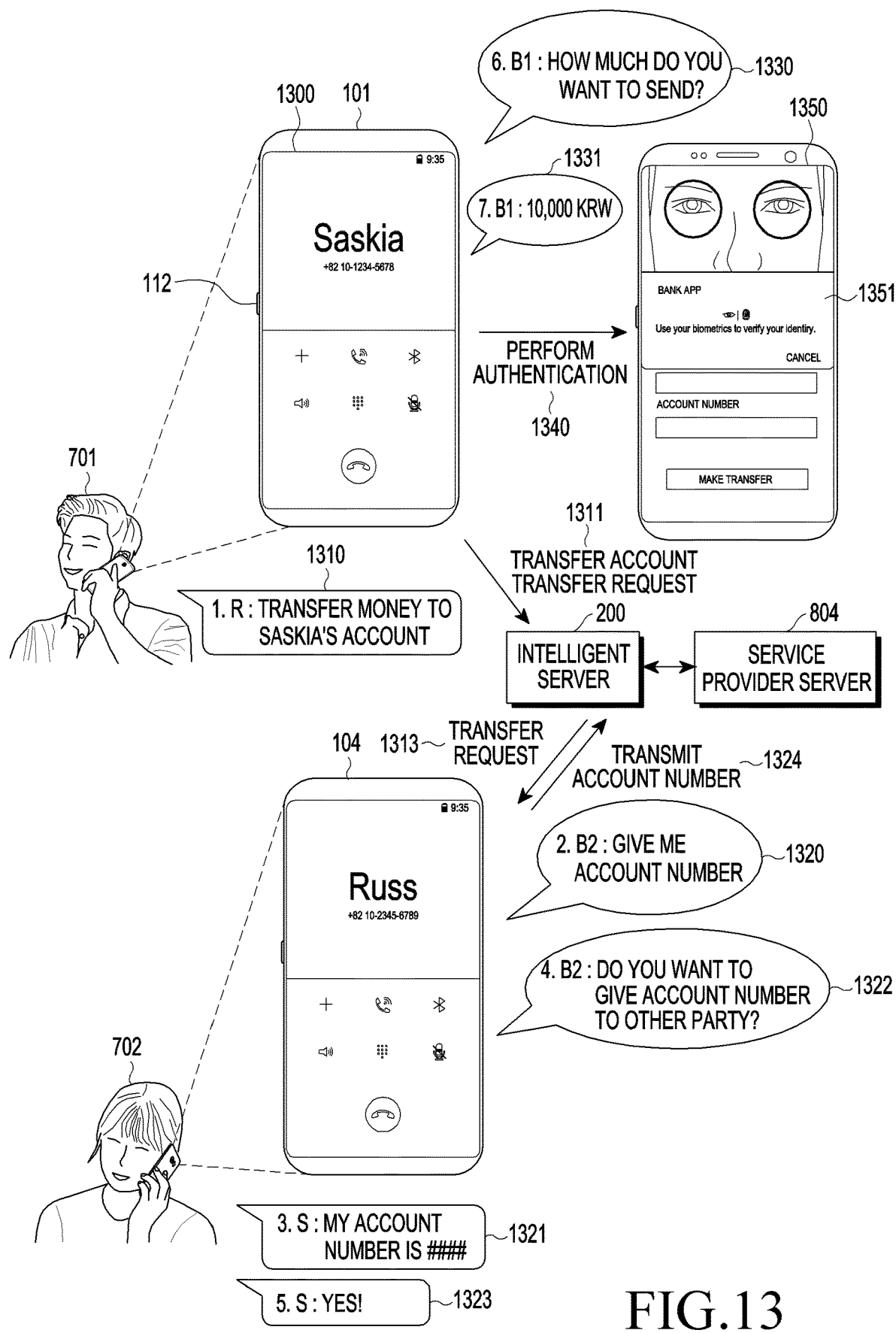
FIG. 13 is a diagram illustrating an example of performing an intelligent service by an utterance received during a call between users in an intelligent system according to an embodiment of the disclosure.

FIG. 13 is a diagram illustrating an example of performing an intelligent service by an utterance received during a call between users in an intelligent system according to an embodiment of the disclosure.

Referring to FIG. 13, an intelligent system may include at least two electronic devices (e.g., 101 and 104) performing a call, an intelligent server 200, and/or a service provider server 804.

According to an embodiment, a first user (e.g., "Russ") 701 of the electronic device 101 and a second user (e.g., "Saskia") 702 of the external electronic device 104 may be performing a call and, as a particular one of the electronic devices identifies a predesignated utterance or a selection of a designated button 112, an intelligent service may be activated on the electronic devices.

According to an embodiment, the utterance received through the electronic devices may be transmitted to the intelligent server 200 and, to provide a service corresponding to the utterance, the intelligent server 200 may send a request for a banking service to the service provider server 804.

According to an embodiment, in operation 1310, the electronic device 101 may identify a first utterance received from the first user 701 after the intelligent system is activated. For example, the first utterance may be one for an account transfer to the account of the second user 702 and may contain such content as "Transfer money to Saskia's account."

In operation 1311, the electronic device 101 may transmit the first utterance for requesting the account transfer to the account of the second user 702 to the intelligent server 200.

In operation 1313, the intelligent server 200 may transmit the request to the external electronic device 104. For example, the intelligent server 200 may transmit a command to request the account number to the user of the external electronic device 104.

In operation 1320, an intelligent service (e.g., a second Bixby B2) of the external electronic device 104 may output the request in the form of a voice or image, notifying the second user 702 of the content of request. For example, the content of request output may include a content of requesting the account number, e.g., "Give me account number."

In operation 1321, the external electronic device 104 may receive a third utterance containing a response to the output request from the second user 702. For example, the response may contain "My account number is ###" as the content containing the account number information.

In operation 1322, the external electronic device 104 may output data of inquiring whether to transmit the response to the electronic device 101 in the form of a voice or image. For example, when the external electronic device 104 may identify the account information about the second user 702, the external electronic device 104 may transmit data to identify whether to transmit the account information about the second user 702 to the first user 701 to the electronic device 101. According to an embodiment, the data may contain, e.g., "Do you want to give the account number to other party?"

In operation 1323, the external electronic device 104 may receive a response to a fourth utterance from the second user 702. For example, the response to the fourth utterance may include, e.g., "Yes," as agreeing to the transmission of the account number.

In operation 1324, by identifying the response of agreeing to the fourth utterance, the external electronic device 104 may transmit the account number input by the second user 702 to the intelligent server 200.

In operation 1330, the intelligent server 200 may send a request as to how much to send to the second user 702 to the electronic device 101 and an intelligent service (e.g., first Byxby B1) of the electronic device 101 may output the data of inquiring about the remittance in the form of a voice or image. For example, the data may contain, e.g., "How much do you want to send?"

In operation 1331, the electronic device 101 may identify receiving a seventh utterance responsive to the data of inquiring about the remittance from the first user 701. For example, the seventh utterance may contain, e.g., "10,000 KRW," as the content related to the remittance.

According to an embodiment, the electronic device 101 may transmit the seventh utterance to the intelligent server 200, and the intelligent server 200 may transmit the account number of the second user 702, the remittance contained in the seventh utterance, or other remittance service-related data to the service provider server 804 which provides the remittance service.

According to an embodiment, the service provider server 804 may send a particular amount of money from the account of the first user 701 to the account of the second user 702 using the data received from the intelligent server 200 and transmit a result of processing the remittance service to the electronic device 101.

According to an embodiment, the service provider server 804 may store account information about users (e.g., the first user 701 or the second user 702). In this case, some of the operations (e.g., 1320 or 1321) of identifying the account number may be omitted.

According to an embodiment, the intelligent server 200 may analyze the command information contained in the response, receive information necessary to perform the account transfer from the service provider server 804, and generate a path rule based on the received information. The path rule may be transmitted to the electronic device 101.

According to an embodiment, when the account information related to both the user and the other party between which the account transfer is performed may be identified when the path rule is generated, the intelligent server 200 may transmit information related to performing the account transfer to the electronic device 101 and, when at least in part of the account information related to the user or the other party may be identified, the intelligent server 200 may receive the account information through an additional inquiry and generate the path rule further based on the received information.

According to an embodiment, the electronic device 101 may execute a financial application based on the path rule received from the intelligent server 200, obtain necessary information (e.g., account information or remittance information), perform authentication on the first user 701, and perform the account transfer based on a result of the authentication.

In operation 1340, the electronic device 101 may perform authentication for the remittance service based on the result of process received from the intelligent server 200. For example, the electronic device 101 may display a message 1351 on screen 1350 to indicate that authentication is performed, receive authentication information (e.g., fingerprint or iris) from the first user 701, and authenticate the corresponding user depending on whether the authentication information corresponds to preset information.

According to an embodiment, to provide a banking service with higher security, authentication may be carried out in various manners, such as determining biometric information (e.g., voice pattern, fingerprint, iris, etc.) about the first user 701 or the second user 702, whether a designated password is input, or whether designated users (e.g., the first user 701 and the second user 702) fulfills a designated action within a predetermined time.

Figure 14:
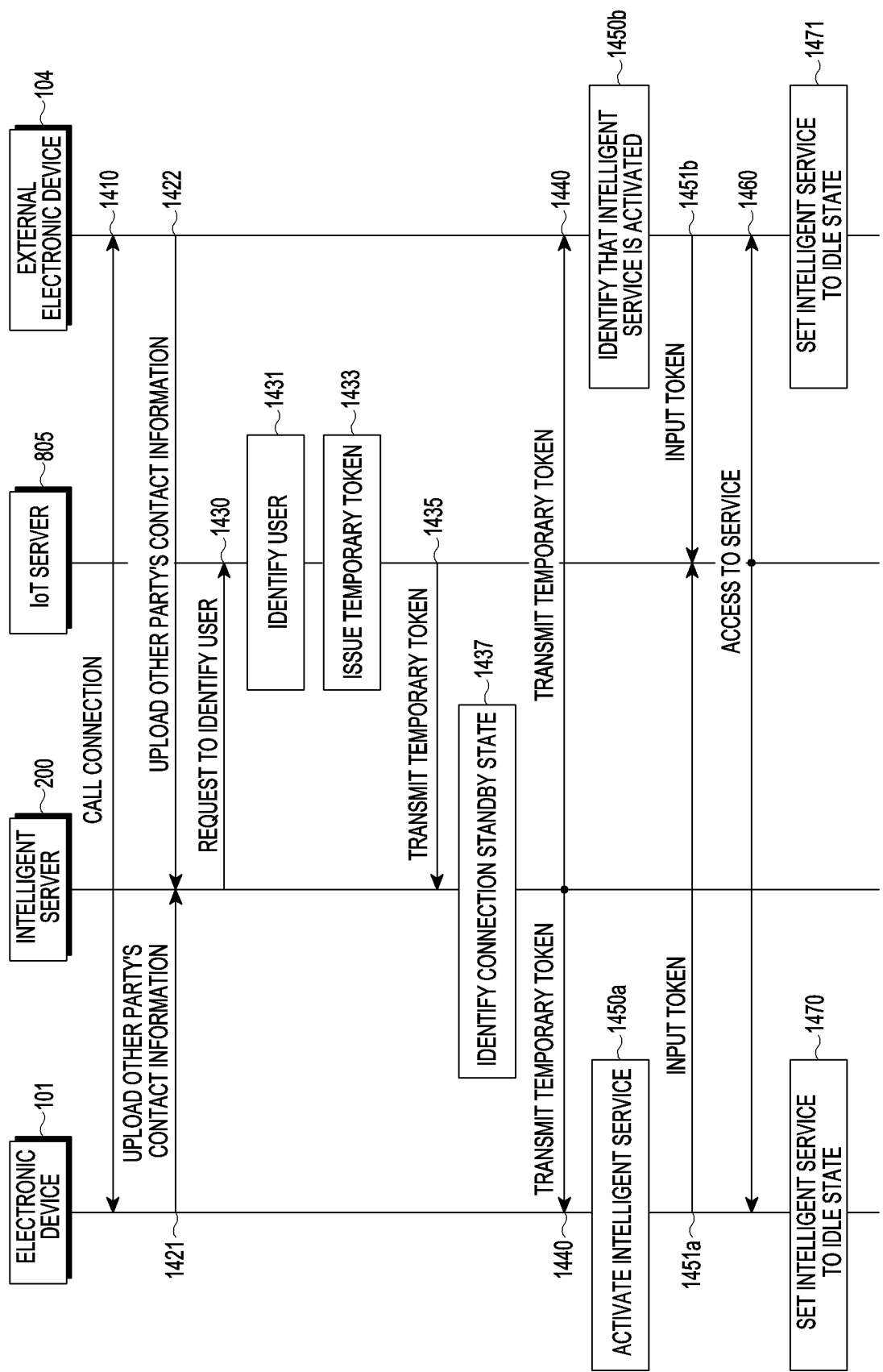
FIG. 14 is a flowchart illustrating example operations of an electronic device and server providing an intelligent service based on an utterance between users who perform a call according to an embodiment of the disclosure.

FIG. 14 is a flowchart illustrating example operations of an electronic device and server providing an intelligent service based on an utterance between users who perform a call according to an embodiment of the disclosure.

Referring to FIG. 14, an intelligent system may include at least two electronic devices (e.g., 101 and 104) performing a call, an intelligent server 803, and/or an IoT server 805.

In operation 1410, the electronic device 101 may perform a call connection with the external electronic device 104.

In operation 1421, the electronic device 101 may upload the contact information about the other party (e.g., the external electronic device 104) to which the call is currently performed onto the intelligent server 200. For example, in response to receiving a designated input (e.g., a key input) during the call with the external electronic device 104, the electronic device 101 may upload the contact information about the external electronic device 104 onto the intelligent server 200.

In operation 1422, the external electronic device 104 may upload the contact information about the other party (e.g., the electronic device 101) to which the call is currently performed onto the intelligent server 200.

In operation 1430, the intelligent server 200 may transmit the uploaded contact information to the IoT server 805 and request to identify whether the user corresponding to the contact information is a user registered in the IoT server 805.

According to an embodiment, as the electronic device 101 and the external electronic device 104 upload their other party's contact information, the intelligent server 200 may determine that the users of the electronic devices have agreed to a service for identifying each other and transmit the uploaded contact information to the IoT server 805. For example, at least part of the contact information about the electronic device 101 and the external electronic device 104 is not received within a predetermined time, the intelligent server 200 may delete out the stored contact information.

In operation 1431, the IoT server 805 may identify the requested user.

In operation 1433, the IoT server 805 may issue a temporary token for the electronic device 101 and the external electronic device 104 which have uploaded the contact information depending on a result of the identification. For example, the temporary token may contain password information for the electronic device 101 or the external electronic device 104 to access the service of the IoT server 805 and may contain information that is valid only for a predetermined time period or a predetermined number of times.

In operation 1435, the IoT server 805 may transmit the issued temporary token to the intelligent server 200.

In operation 1437, the intelligent server 200 may identify a connection standby state between the user (e.g., "Russ") of the electronic device 101 and the user (e.g., "Saskia") of the external electronic device 104. For example, the connection standby state may indicate whether the intelligent server 200 activates the intelligent service by a designated input when the electronic device 101 and the external electronic device 104 perform a call.

In operation 1440, the intelligent server 200 may transmit the temporary token issued for at least one of the electronic device 101 or the external electronic device 104.

In operation 1450a, the electronic device 101 may activate the intelligent service, in response to identifying a designated input (e.g., voice or button selection) during the call.

In operation 1450b, the external electronic device 104 may identify that the intelligent service is activated. For example, as the external electronic device 104 identifies a designated input (e.g., voice or button selection) on the other party's device (e.g., the electronic device 101) during the call, the intelligent service may be activated, and data indicating that the intelligent service is activated may be output in the form of a voice or image.

In operation 1451a, the electronic device 101 may transmit the token received from the intelligent server 200 to the IoT server 805.

According to an embodiment, the intelligent service may be activated on the electronic device 101, and a particular utterance (e.g., "Invite Saskia (the user of the external electronic device 104) to home network!") may be received. For example, as the utterance contains a request for access of the other party's device (e.g., the external electronic device 104) to a particular network, the temporary token received from the intelligent server 200 may be transmitted to the IoT server 805.

In operation 1451b, the external electronic device 104 may transmit the token received from the intelligent server 200 to the IoT server 805. For example, in response to receiving the utterance to request for the external electronic device 104 to access the particular network from the other party's device (e.g., the electronic device 101), the external electronic device 104 may transmit the temporary token, transmitted from the intelligent server 200 for access to the network, to the IoT server 805.

In operation 1460, the IoT server 805 may transmit information for identifying access to the service provided from the IoT server 805, to the electronic device 101 and the external electronic device 104.

In operation 1470, in response to identifying that the external electronic device 104 has connected to the IoT server 805, the electronic device 101 may set the activated intelligent service to an idle state and receive the service from the IoT server 805.

In operation 1471, in response to identifying that the network with the electronic device 101 has been connected through the service of the IoT server 805, the external electronic device 104 may set the activated intelligent service to the idle state and receive the service from the IoT server 805.

According to an embodiment, when the intelligent service is set to the idle state on the electronic device 101 or the external electronic device 104, a utterance received in the idle state may be transmitted to the IoT server 805 instead of the intelligent server 200. For example, the IoT server 805 may control at least one IoT device connected with the IoT server 805 in relation to the utterance transmitted.

According to an embodiment, as an input for activating the intelligent service and an additional utterance are received during a call between the electronic devices, such a token may be issued as to authenticate the electronic devices and allow the electronic devices to access a particular service, and the users may enable the electronic devices to access a particular network and control the electronic devices constituting the network simply by receiving a utterance and without any further action.

According to an embodiment, although in the above description the intelligent server 200 uses a token to authenticate an electronic device, authentication may be performed in other various manners by receiving the user's biometric information (e.g., voice pattern, fingerprint, or iris) or based on whether a designated password is input or whether a designated action is performed.

Figure 15:
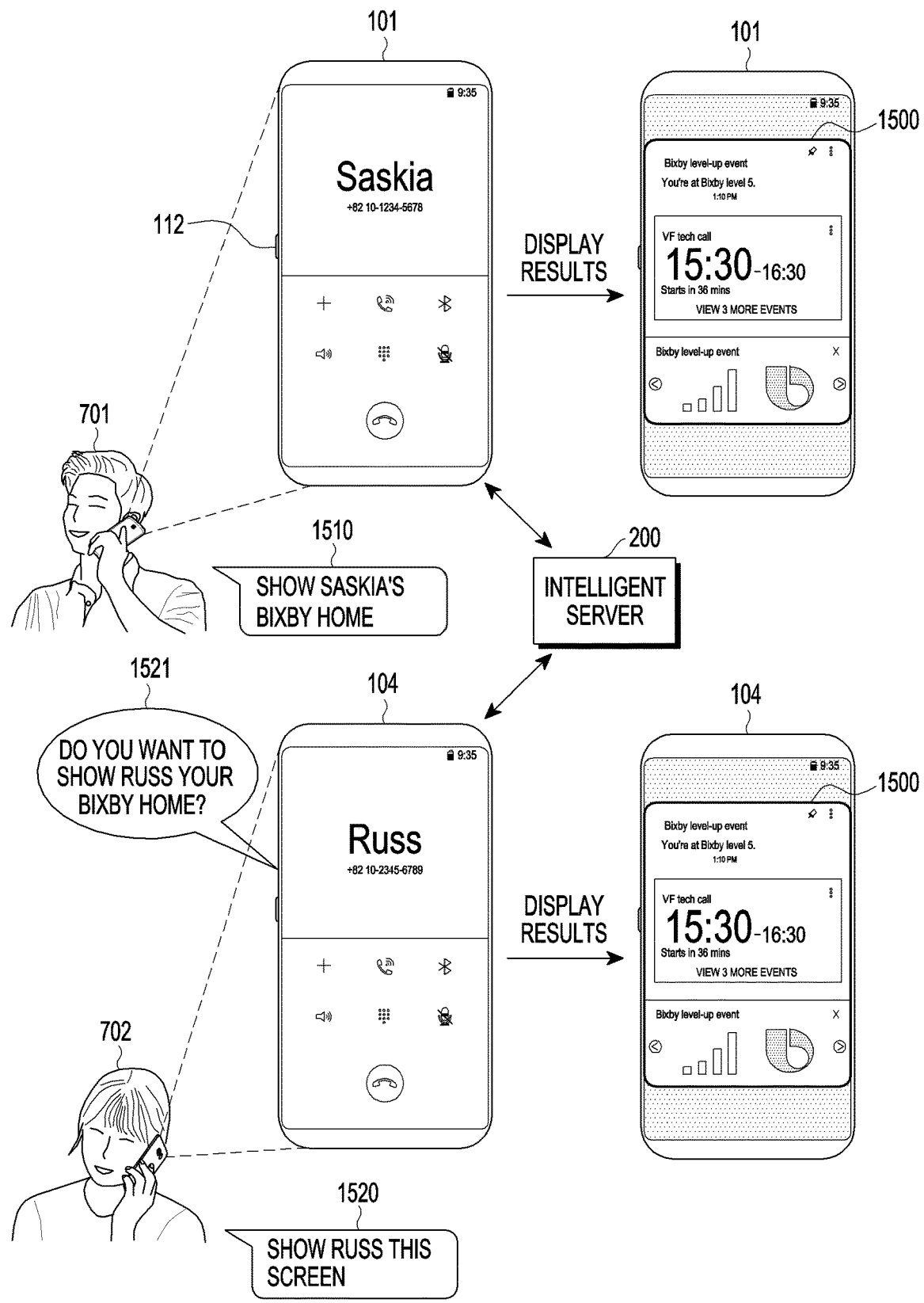
FIG. 15 is a diagram illustrating an example of performing an intelligent service by an utterance received during a call between users in an intelligent system according to an embodiment of the disclosure.

FIG. 15 is a diagram illustrating an example of performing an intelligent service by an utterance received during a call between users in an intelligent system according to an embodiment of the disclosure.

Referring to FIG. 15, an intelligent system may include at least two electronic devices (e.g., 101 and 104) performing a call or an intelligent server 200.

According to an embodiment, a first user (e.g., "Russ") 701 of the electronic device 101 and a second user (e.g., "Saskia") 702 of the external electronic device 104 may be performing a call and, as a particular one of the electronic devices identifies a predesignated utterance or a selection of a designated button 112, an intelligent service may be activated on the electronic devices.

According to an embodiment, in operation 1510, the electronic device 101 may identify a first utterance received from the first user 701 after the intelligent system is activated and transmit the first utterance to the intelligent server 200. For example, the first utterance may contain, e.g., "Show Saskia's Bixby home!" as a request for a network setting screen 1500 with the second user (e.g., 'Saskia') 702 who is performing the call.

According to an embodiment, the intelligent server 200 may transmit a response to the first utterance to the electronic device 101 or the external electronic device 104. For example, the response to the first utterance may include data to display the Bixby home screen 1500 of the second user (e.g., 'Saskia').

According to an embodiment, the electronic device 101 may output the response to the first utterance as a result of the first utterance. For example, the second user's Bixby home screen may include, e.g., event information generated in relation to the second user's network.

According to an embodiment, the external electronic device 104 may display the second user's Bixby home screen 1500 before performing a call with the first user 701. As the external electronic device 104 performs a call with the electronic device 101, the network setting screen 1500 may be displayed on the background.

According to an embodiment, as the intelligent system is activated, and a second utterance for requesting to display the second user's Bixby home screen 1500 on the electronic device 101 of the first user 701 is received by the second user 702, the external electronic device 104 may transmit the second utterance to the intelligent server 200. For example, in response to the second utterance, the intelligent server 200 may transmit data for displaying the second user's Bixby home screen 1500 to the electronic device 101.

According to an embodiment, the response to the first utterance may include data for identifying whether to display the second user's Bixby home screen 1500 on the electronic device (e.g., the external electronic device 104) of the other party (e.g., the second user 702). For example, the external electronic device 104 may output the received data in the form of a voice 1521 and, as the first utterance is received, the data may contain, e.g., "Do you want to show Russ Bixby home?"

According to an embodiment, when the second user 702 inputs a response 1520 (e.g., "Show Russ this screen") to the voice data, the external electronic device 104 may transmit the response of the second user 702 to the intelligent server 200. For example, according to the response of the second user 702, the intelligent server 200 may determine whether the electronic device 101 determines the network setting screen 1500.

According to an embodiment, the intelligent server 200 may generate a path rule to share data of the external electronic device 104 with the electronic device 101 based on the response of the second user 702 and transmit the path rule to the external electronic device 104. The external electronic device 104 may share the data via a network (e.g., the network 199) based on the path rule received from the intelligent server 200.

According to an embodiment, the electronic device may identify an input to activate an intelligent service during a call and identify receiving of a utterance to request to display a screen of a running application on the other party's electronic device. For example, the electronic device may display the screen or perform control to display the screen on the other party's electronic device while maintaining the call state.

Figure 16:
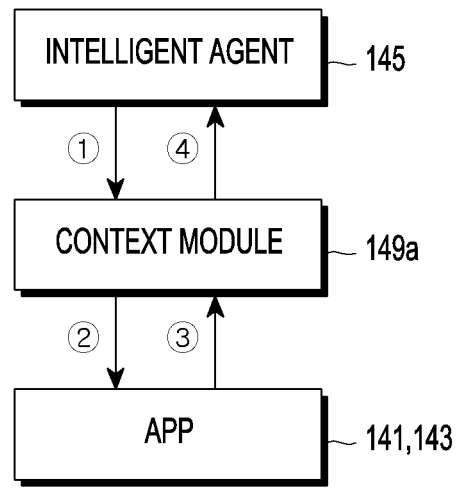
FIG. 16 is a diagram illustrating an example of identifying current states by a context module of an intelligent service module according to an embodiment of the disclosure.

FIG. 16 is a diagram illustrating an example of identifying current states by a context module of an intelligent service module according to an embodiment of the disclosure.

Referring to FIG. 16, upon receiving (☐) a context request from the intelligent agent 145, the processor 120 may send a request (☐) for context information indicating the current states to the apps 141 and 143 via the context module 149*a*. According to an embodiment of the disclosure, the processor 120 may, through the context module 149*a*, receive (☐) the context information from the apps 141 and 143 and send (☐) to the intelligent agent 145.

According to an embodiment, the processor 120 may receive a plurality of context information from the apps 141 and 143 via the context module 149*a*. The context information may be, e.g., information about the apps 141 and 143 executed latest. As another example, the context information may be information about the current states of the apps 141 and 143 (e.g., in the case a photo is viewed in a gallery, information about the photo).

According to an embodiment of the disclosure, the processor 120 may, through the context module 149*a*, receive the context information indicating the current state of the electronic device 101 not only from the apps 141 and 143 but also from a device platform. The context information may include normal context information, user context information, or device context information.

The normal context information may include, for example, normal information about the electronic device 101. The normal context information may be identified by receiving data through, e.g., a sensor hub of the device platform, and by an internal algorithm. For example, the normal context information may include information about the current time/space. The information about the current time/space may include information about, e.g., the current time, or the current location of the electronic device 101. The current time may be identified by the clock of the electronic device 101, and the information about the current location may be identified by the global positioning system (GPS). As another example, the normal context information may include information about physical motion. The information about physical motion may include information about, e.g., walking, running, or driving. The physical motion information may be identified by a motion sensor. The driving information may be identified by the motion sensor, and a Bluetooth connection in the vehicle may be detected so that getting aboard and parking may be identified. As another example, the normal context information may include user activity information. The user activity information may include information about, e.g., commuting, shopping, or traveling. The user activity information may be identified using information about the place which has been registered in the database by the user or app.

The user context information may include information about the user. For example, the user context information may include information about the user's emotional state. The emotional state information may include information about, e.g., the user's happiness, sadness, or anger. As another example, the user context information may include information about the user's current state. The current state information may include information about, e.g., interest or intent (e.g., shopping).

The device context information may include information about the state of the electronic device 101. For example, the device context information may include information about the path rule executed by the execution manager module 147. As another example, the device information may include battery information. The battery information may be identified through, e.g., charged or discharged state of the battery. As another example, the device information may include information about the network or a connected device. The information about the connected device may be identified through the communication interface connected with the device.

Figure 17:
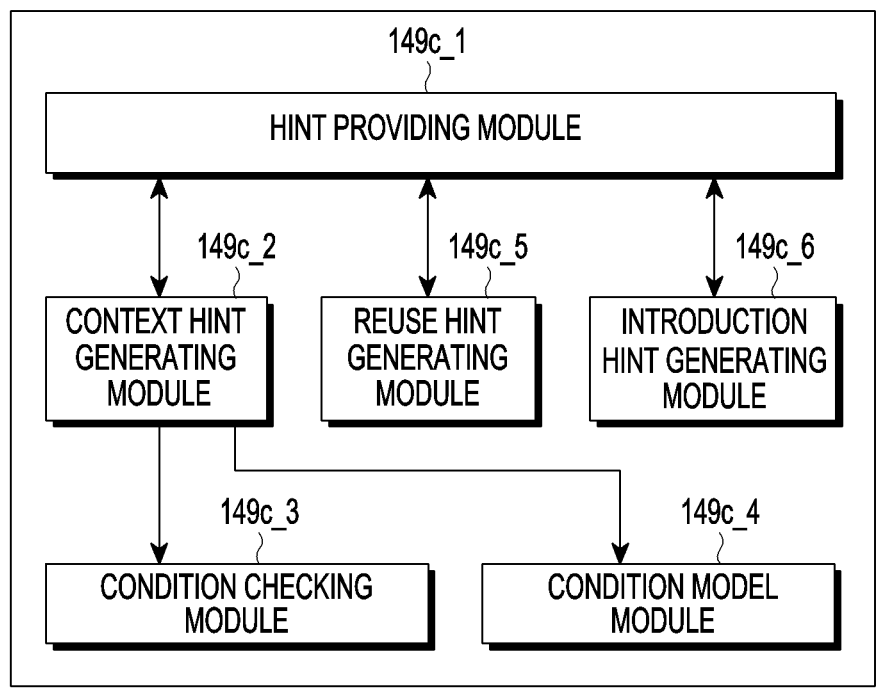
FIG. 17 is a block diagram illustrating an example proposing module of an intelligent service module according to an embodiment of the disclosure.

FIG. 17 is a block diagram illustrating an example proposing module of an intelligent service module according to an embodiment of the disclosure.

Referring to FIG. 17, the proposing module 149*c* may include a hint providing module (e.g., including processing circuitry and/or executable program elements) 149*c*_1, a context hint generating module (e.g., including processing circuitry and/or executable program elements) 149*c*_2, a condition checking module (e.g., including processing circuitry and/or executable program elements) 149*c*_3, condition model module (e.g., including processing circuitry and/or executable program elements) 149*c*_4, a reuse hint generating module (e.g., including processing circuitry and/or executable program elements) 149*c*_5, and/or an introduction hint generating module (e.g., including processing circuitry and/or executable program elements) 149*c*_6.

According to an embodiment of the disclosure, the processor 120 may execute the hint providing module 149*c*_1 may provide hints to the user. For example, the processor 120 may, through the hint providing module 149*c*_1, receive generated hints from the context hint generating module 149*c*_2, the reuse hint generating module 149*c*_5, or introduction hint generating module 149*c*_6 and provide the hints to the user.

According to an embodiment of the disclosure, the processor 120 may execute the condition checking module 149*c*_3 or the condition model module 149*c*_4 to generate hits recommendable based on the current state. The processor 120 may execute the condition checking module 149*c*_3 to receive information corresponding to the current state and execute the condition model module 149*c*_4 to set a condition model using the received information. For example, the processor 120 may execute the condition model module 149c_4 to identify, e.g., the time, location, context, or app being used, and provide the user with the hints highly likely to be used in descending order of priority.

According to an embodiment of the disclosure, the processor 120 may execute the reuse hint generating module 149c_5 to generate hints based on the use frequency. For example, the processor 120 may execute the reuse hint generating module 149c_5 to generate hints based on the user's use pattern.

According to an embodiment of the disclosure, the introduction hint generating module 149c_6 may generate hints to introduce the user to new functions or functions that other users frequently use. For example, a hint to introduce new functions may include an introduction to the intelligent agent 145 (e.g., a method to operate).

According to an embodiment of the disclosure, the context hint generating module 149c_2, condition checking module 149c_3, condition model module 149c_4, reuse hint generating module 149c_5, or introduction hint generating module 149c_6 of the proposing module 149c may be included in the personal information server 300. For example, the processor 120 may, through the hint providing module 149c_1 of the proposing module 149c, receive hints from the context hint generating module 149c_2, reuse hint generating module 149c_5, or introduction hint generating module 149c_6 of the personal information server 300 and provide the received hints to the user.

According to an embodiment of the disclosure, the electronic device 101 may provide hints according to a series of processes as follows. For example, upon receiving a provide hint request from the intelligent agent 145, the processor 120 may transfer a generate hint request to the context hint generating module 149c_2 through the hint providing module 149c_1. Upon receiving the generate hint request, the processor 120 may, through the condition checking module 149c_3, receive information corresponding to the current state from the context module 149a and persona module 149b. The processor 120 may transfer the received information to the condition model module 149c_4 through the condition checking module 149c_3 and may, the condition model module 149c_4, assign priorities to the hints provided to the user in descending order of availability using the information. The processor 120 may, through the context hint generating module 149c_2, identify the condition and generate hints corresponding to the current state. The processor 120 may transfer the generated hints to the hint providing module 149c_1 through the context hint generating module 149c_2. The processor 120 may, through the hint providing module 149c_1, sort the hints based on a designated rule and transfer the hints to the intelligent agent 145.

According to an embodiment of the disclosure, the processor 120 may, through the hint providing module 149c_1, generate a plurality of context hints and assign priorities to the plurality of context hints based on a designated rule. According to an embodiment of the disclosure, the processor 120 may, through the hint providing module 149c_1, first provide the user with the higher-priority ones among the plurality of context hints.

According to an embodiment of the disclosure, the electronic device 101 may propose hints based on the use frequency. For example, upon receiving a provide hint request from the intelligent agent 145, the processor 120 may transfer a generate hint request to the reuse hint generating module 149c_5 through the hint providing module 149c_1. Upon receiving the generate hint request, the processor 120 may, through the reuse hint generating module 149c_5, receive user information from the persona module 149b. For example, the processor 120 may, through the reuse hint generating module 149c_5, receive the path rule included in the user's preference information, parameters included in the path rule, frequency of execution of app, and information about the time/space when the app has been used, from the persona module 149b. The processor 120 may generate hints corresponding to the received user information through the reuse hint generating module 149c_5. The processor 120 may transfer the generated hints to the hint providing module 149c_1 through the reuse hint generating module 149c_5. The processor 120 may, through the hint providing module 149c_1, sort the hints and transfer the hints to the intelligent agent 145.

According to an embodiment of the disclosure, the electronic device 101 may propose hints for new functions. For example, upon receiving a provide hint request from the intelligent agent 145, the processor 120 may transfer a generate hint request to the introduction hint generating module 149c_6 through the hint providing module 149c_1. The processor 120 may, through the introduction hint generating module 149c_6, transfer a provide introduction hint request from a proposing server 400 and receive information about functions to be introduced from the proposing server 400. For example, the proposing server 400 may store the information about the functions to be introduced. A hint list for the functions to be introduced may be updated by the service operator. The processor 120 may transfer the generated hints to the hint providing module 149c_1 through the introduction hint generating module 149c_6. The processor 120 may, through the hint providing module 149c_1, sort the hints and transmit the hints to the intelligent agent 145.

Accordingly, the processor 120 may provide hints generated by the context hint generating module 149c_2, reuse hint generating module 149c_5, or introduction hint generating module 149c_6 to the user through the proposing module 149c. For example, the processor 120 may, through the proposing module 149c, display the generated hints on the app that operates the intelligent agent 145 and receive inputs to select the hints from the user through the app.

Figure 18:
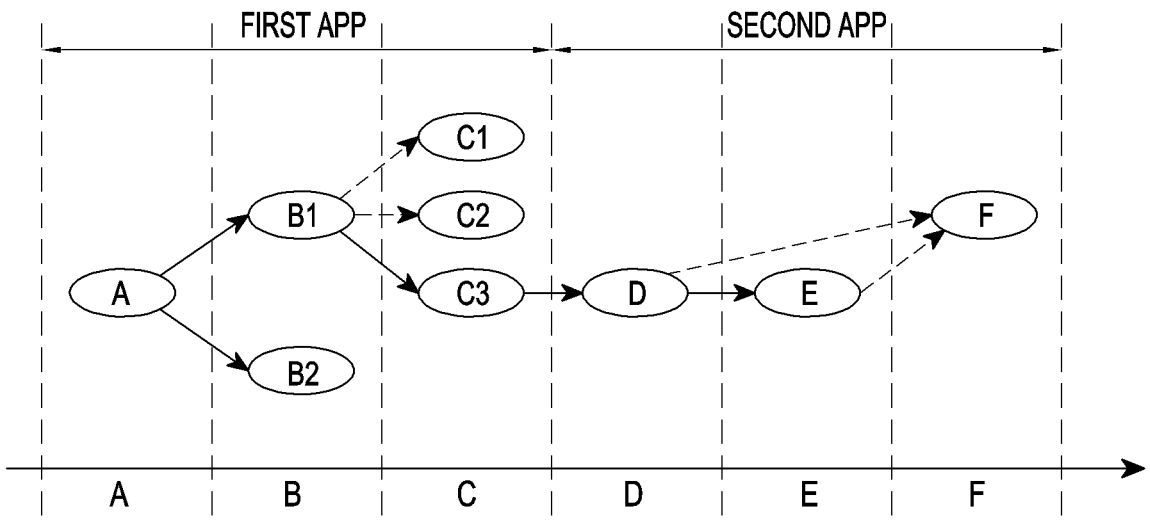
FIG. 18 is a diagram illustrating an example method for generating a path rule by a path natural language understanding module (NLU) according to an embodiment of the disclosure.

FIG. 18 is a diagram illustrating an example method for generating a path rule by a path natural language understanding module (NLU) according to an embodiment of the disclosure.

Referring to FIG. 18, according to an embodiment of the disclosure, the NLU module 220 may functions of an app into any one operation (e.g., state A to state F) and store in the path rule database 231. For example, the NLU module 220 may store a path rule set including a plurality of path rules A-B1-C1, A-B1-C2, A-B1-C3-D-F, A-B1-C3-D-E-F and A-B2 divided into any one operation in the path rule database 231.

According to an embodiment of the disclosure, the path rule database 231 of the path planner module 230 may store the path rule set to perform the functions of the app. The path rule set may include a plurality of path rules including the plurality of operations (e.g., a sequence of states). In the plurality of path rules, the operations executed based on the parameters each input to a respective one of the plurality of operations may sequentially be arranged. According to an embodiment of the disclosure, the plurality of path rules may be configured in the form of ontology or a graph model and stored in the path rule database 231.

According to an embodiment of the disclosure, the NLU module 220 may select the optimal one A-B1-C3-D-F of the plurality of path rules A-B1-C1, A-B1-C2, A-B1-C3-D-F, A-B1-C3-D-E-F and A-B2 corresponding to the parameters and the intent of the user input.

According to an embodiment of the disclosure, the NLU module 220 may transfer the plurality of path rules to the electronic device 101 unless there is a path rule perfectly matching the user input. For example, the NLU module 220 may select the path rule (e.g., A-B1) partially corresponding to the user input. The NLU module 220 may select one or more path rules (e.g., A-B1-C1, A-B1-C2, A-B1-C3-D-F, A-B1-C3-D-E-F, A-B2) including the path rule (e.g., A-B1) partially corresponding to the user input and transfer the selected one or more path rules to the electronic device 101.

According to an embodiment of the disclosure, the NLU module 220 may select one of the plurality of path rules based on an additional input of the electronic device 101 and transfer the selected path rule to the electronic device 101. For example, the NLU module 220 may select one (e.g., A-B1-C3-D-F) among the plurality of path rules (e.g., A-B1-C1, A-B1-C2, A-B1-C3-D-F, A-B1-C3-D-E-F, A-B2) based on an additional user input (e.g., an input to select C3) of the electronic device 101 and send the selected path rule to the electronic device 101.

According to an embodiment of the disclosure, the NLU module 220 may determine the user's intent and parameters corresponding to the additional user input (e.g., an input to select C3) to the electronic device 101 through the NLU module 220 and send the user's intent or parameters determined to the electronic device 101. The electronic device 101 may select one (e.g., A-B1-C3-D-F) among the plurality of path rules (e.g., A-B1-C1, A-B1-C2, A-B1-C3-D-F, A-B1-C3-D-E-F, A-B2) based on the parameters or intent sent.

Accordingly, the electronic device 101 may complete the operations of the apps 141 and 143 by the selected path rule.

According to an embodiment of the disclosure, when a user input having insufficient information is received by the intelligent server 200, the NLU module 220 may generate a path rule partially corresponding to the received user input. For example, the NLU module 220 may send the partially corresponding path rule to the intelligent agent 145. The processor 120 may execute the intelligent agent 145 to receive the path rule and transfer the partially corresponding path rule to the execution manager module 147. The processor 120 may execute a first app 141 based on the path rule through the execution manager module 147. The processor 120 may, through the execution manager module 147, send information about the insufficient parameters to the intelligent agent 145 while executing the first app 141. The processor 120 may, through the intelligent agent 145, send a request for additional input to the user using the information about the insufficient parameters. Upon receiving an additional input from the user, the processor 120 may, through the intelligent agent 145, send the path rule to the intelligent server 200 for processing. The NLU module 220 may generate an added path rule based on the parameter information and intent of the additional user input and send the path rule to the intelligent agent 145. The processor 120 may, through the intelligent agent 145, send the path rule to the execution manager module 147 to execute a second app 143.

According to an embodiment of the disclosure, when a user input having some missing information is received by the intelligent server 200, the NLU module 220 may send a request for user information to the personal information server 300. The personal information server 300 may send, to the NLU module 220, information about the user who has obtained the user input stored in the persona database. The NLU module 220 may select a path rule corresponding to the user input having some missing operations using the user information. Accordingly, although a user input having some missing information is received by the intelligent server 200, the NLU module 220 may send a request for the missing information and receive an additional input, or the NLU module 3220 may use the user information, determining a path rule corresponding to the user input.

Table 1 below may represent an example path rule related to tasks requested by the user according to an embodiment.

TABLE 1

| Path rule ID | State | parameter |
| --- | --- | --- |
| Gallery_101 | pictureView(25) | NULL |
| | searchView(26) | NULL |
| | searchViewResult(27) | Location, time |
| | SearchEmptySelectedView(28) | NULL |
| | SearchSelectedView(29) | ContentType, selectall |
| | CrossShare(30) | anaphora |

Referring to Table 1, a path rule generated or selected by an intelligent server (e.g., the intelligent server 200 of FIG. 1) according to a user utterance (e.g., "Share photos") may include at least one state 25, 26, 27, 28, 29, or 30. For example, the at least one state (e.g., any one operation state of the terminal) may correspond to at least one of executing a photo application (PictureView) 25, executing a photo search function (SearchView) 26, outputting a search result display screen (SearchViewResult) 27, outputting a search result display screen with no photo selected (SearchEmptySelectedView) 28, outputting a search result display screen with at least one photo selected (SearchSelectedView) 29, and/or outputting a shared application selection screen (CrossShare) 30.

According to an embodiment, the path rule parameter information may correspond to at least one state. For example, it may be included in the state 29 of outputting a search result display screen with at least one photo selected.

As a result of performing the path rule including the sequence of states 25, 26, 27, 28, 29, and/or 30, the task (e.g., "Share photos!") requested by the user may be performed.

Figure 19:
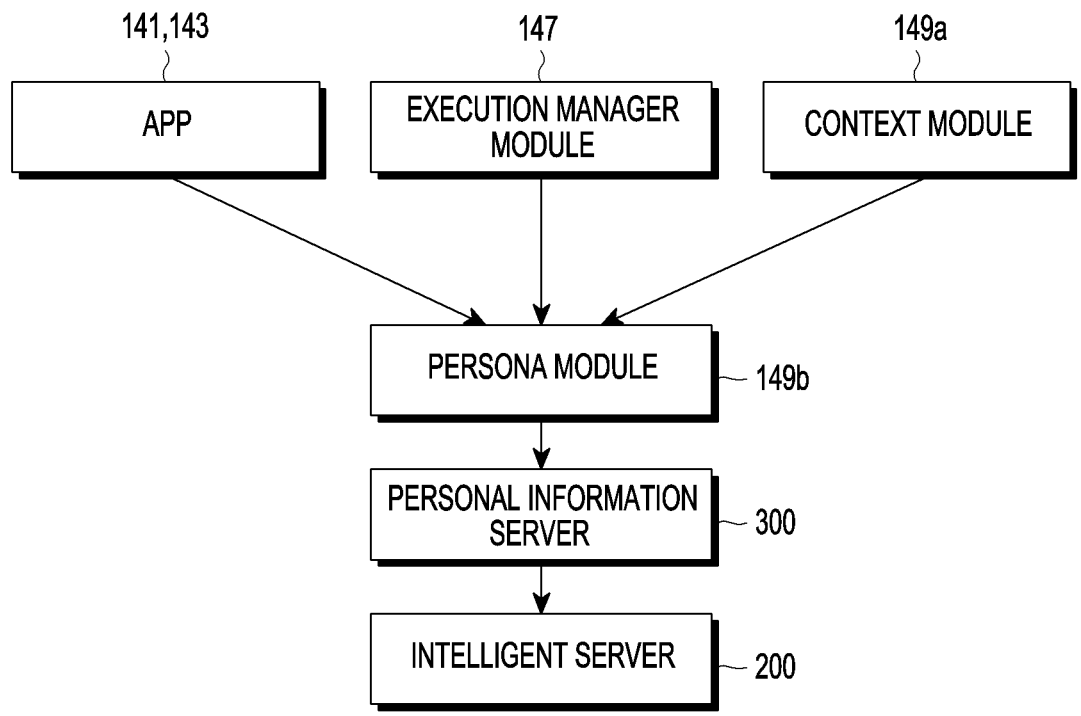
FIG. 19 is a diagram illustrating an example of managing user information by a persona module of an intelligent service module according to an embodiment of the disclosure.

FIG. 19 is a diagram illustrating an example of managing user information by a persona module of an intelligent service module according to an embodiment of the disclosure.

Referring to FIG. 19, the processor 120 may receive information about the electronic device 101 from the apps 141 and 143, execution manager module 147, or the context module 149a through the persona module 149b. The processor 120 may, through the apps 141 and 143 and the execution manager module 147, store resultant information of execution of the app operations 141b and 143b in the operation log database. The processor 120 may, through the context module 149a, store information about the current state of the electronic device 101 in the context database. The processor 120 may, through the persona module 149, receive the stored information from the operation log database or the context database. The data stored in the operation log database and the context database may be analyzed by, e.g., an analysis engine, and transferred to the persona module 149b.

According to an embodiment of the disclosure, the processor 120 may, through the persona module 149b, send the information received from the apps 141 and 143, the execution manager module 147, or the context module 149a to the proposing module 149c. For example, the processor 120 may, through the persona module 149b, transfer the data stored in the operation log database or context database to the proposing module 149c.

According to an embodiment of the disclosure, the processor 120 may, through the persona module 149b, send the information received from the apps 141 and 143, the execution manager module 147, or the context module 149a to the personal information server 300. For example, the processor 120 may, through the persona module 149b, periodically send the data accrued in the operation log database or context database to the personal information server 300.

According to an embodiment, the processor 120 may, through the persona module 149b, transfer the data stored in the operation log database or context database to the proposing module 149c. User information generated by the persona module 149b may be stored in a persona database. The persona module 149b may periodically send user information stored in the persona database to the personal information server 300. According to an embodiment of the disclosure, the information sent by the persona module 149b to the personal information server 300 may be stored in the persona database. The personal information server 300 may infer user information necessary to generate a path rule of the intelligent server 200 using the information stored in the persona database.

According to an embodiment of the disclosure, the user information inferred using the information sent from the persona module 149b may include profile information or preference information. The profile information or the preference information may be inferred through the user's account and accrued information.

The profile information may include the user's personal information. The profile information may include, e.g., the user's population statistics information. The population statistics information may include, e.g., the user's gender or age. As another example, the profile information may include life event information. The life event information may be inferred by comparing log information with a life event model, and reinforced by analyzing the behavior pattern. As another example, the profile information may include interest information. The interest information may include, e.g., shopping goods of interest or field of interest (e.g., sports or politics). For example, the profile information may include activity region information. The activity region information may include information about, e.g., home or working place. The activity region information may include not only information about place or location but also information about regions recorded with priorities based on the accrued time of stay and visit count. For example, the profile information may include activity time information. The activity time information may include information about, e.g., wake-up time, commute time, or sleep time. The commute time information may be inferred using the activity region information (e.g., information about home or working place). The sleep time information may be inferred through unused time of the electronic device 101.

The preference information may include information about the user's preference. For example, the preference information may include information about app preference. The app preference may be inferred through, e.g., record of use of app (e.g., use record per time or place). The app preference may be used to determine an app to be executed based on the user's current state (e.g., time or place). For example, the preference information may include information about contacts preference. The contacts preference may be inferred by analyzing, e.g., information about how frequent one has contact with another, e.g., per time or place. The contacts preference may be used to determine contacts based on the user's current state (e.g., contact to overlapping names). As another example, the preference information may include setting information. The setting information may be inferred by, e.g., analyzing how frequent particular settings are made, e.g., per time or place. The setting information may be used to make particular settings based on the user's current state (e.g., time, place, or context). For example, the preference information may include place preference. The place preference may be inferred through, e.g., a record of visit to a particular place (e.g., a record of visit per time). The place preference may be used to determine the place that the user is visiting based on her current state (e.g., time). For example, the preference information may include command preference. The command preference may be inferred through, e.g., frequency of use of commands (e.g., use frequency per time or place). The command preference may be used to determine a command pattern to be used based on the user's current state (e.g., time or place). In particular, the command preference may include information about the menu chosen mostly by the user in the current state of the app executed through analysis of log information.

The electronic device according to various embodiments may be one of various types of electronic devices. The electronic devices may include, for example, and without limitation, a portable communication device (e.g., a smart phone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "A and/or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, firmware, or any combinations thereof, and may interchangeably be used with other terms, for example, "logic," "logic block," "part," or "circuitry". A module may be a single integral component, or a minimum unit or part thereof, adapted to perform one or more functions. For example, according to an embodiment, a module may be implemented in the form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, but this term does not differentiate between when data is semi-permanently stored in the storage medium and when the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

As is apparent from the foregoing description, according to various embodiments of the disclosure, an electronic device and a method of executing a function of the electronic device may activate an intelligent system to process the user's utterance during a call with another electronic device. Thus, the user may receive various services from the intelligent system according to utterances received during the call.

While the disclosure has been illustrated and described with reference to various example embodiments thereof, it will be understood by those skilled in the art that various changes in form and details may be made therein without departing from the spirit and scope of the disclosure as defined, for example, by the appended claims and their equivalents.

What is claimed is:

1. An electronic device, comprising:
at least one communication circuit;
a speaker;
a microphone;
at least one processor operatively connected with the at least one communication circuit, the speaker, and the microphone; and
a memory operatively connected with the at least one processor,
wherein,
the memory stores instructions which, when executed by the at least one processor, are configured to cause the electronic device to:
perform a call with a first external electronic device through the at least one communication circuit,
activate a voice-based intelligent service while the call is performed,
identify a first voice input through the microphone while the call is performed,
transmit data associated with the first voice input to an external server through the at least one communication circuit at least in part for automatic speech recognition (ASR) and/or natural language understanding (NLU), and
receive, from the external server, first information indicating one or more first operations to be performed by the electronic device through the at least one communication circuit, while the call is performed,
wherein based on the identified first voice input including information indicating the first external electronic device, second information indicating one or more second operations to be performed by the first external electronic device to be transmitted to the first external electronic device, and
wherein at least one of the one or more first operations or the one or more second operations is obtained based on the ASR and/or the NLU of the transmitted data associated with the first voice input by the external server.

2. The electronic device of claim 1, wherein the instructions include instructions which, when executed by the at least one processor, cause the electronic device to activate the voice-based intelligent service in response to receiving a second voice input including at least one of a designated word or a designated input while the call is performed.

3. The electronic device of claim 1, further comprising a display,
wherein the instructions include instructions which, when executed by the at least one processor, cause the electronic device to:
control the display to display information indicating that the voice-based intelligent service is activated while the call is performed, and
control the at least one communication circuit to transmit the information indicating that the voice-based intelligent service is activated while the call is performed to the first external electronic device.

4. The electronic device of claim 1, wherein the instructions include instructions which, when executed by the at least one processor, cause the electronic device to control the at least one communication circuit to transmit information for requesting acknowledgement of an invitation to a designated network to the first external electronic device, in response to the first voice input including information related to inviting the first external electronic device to the designated network.

5. The electronic device of claim 1, wherein the instructions include instructions which, when executed by the at least one processor, cause the electronic device to control the at least one communication circuit to transmit a request to authorize control of at least one second external electronic device to the first external electronic device while the call is performed, in response to the first voice input including information related to controlling the at least one second external electronic device controlled by the first external electronic device connected through a network.

6. The electronic device of claim 1, wherein the instructions include instructions which, when executed by the at least one processor, cause the electronic device to control the at least one communication circuit to transmit a request for information related to an account transfer to the first external electronic device, in response to the first voice input including information related to performing an account transfer to an account of a user of the first external electronic device.

7. The electronic device of claim 6, wherein the instructions include instructions which, when executed by the at least one processor, cause the electronic device to:
receive the account transfer-related information from at least one second external electronic device,
perform authentication to determine whether a user of the electronic device corresponds to pre-determined user information, and
control the at least one communication circuit to transmit, to the external server, the account transfer-related information received while the call is performed based on a result of the authentication.

8. The electronic device of claim 7, wherein the instructions include instructions which, when executed the at least one processor, cause the electronic device to:
identify, based on an input, password information and/or an input biometric information including iris information, voice pattern information, and/or fingerprint information and
identify that the input password information and/or the input biometric information corresponds to pre-stored information to authenticate the user.

9. A method of executing a function of an electronic device, the method comprising:
performing a call with a first external electronic device;
activating a voice-based intelligent service while the call is performed;
identifying a first voice input through a microphone of the electronic device while the call is performed;
transmitting data associated with the first voice input to an external server at least in part for automatic speech recognition (ASR) and/or natural language understanding (NLU); and
receiving, from the external server, first information indicating one or more first operations to be performed by the electronic device while the call is performed,
wherein based on the identified first voice input including information indicating the first external electronic device, second information indicating one or more second operations to be performed by the first external electronic device is transmitted to the first external electronic device, and
wherein at least one of the one or more first operations or the one or more second operations is obtained based on the ASR and/or the NLU of the transmitted data associated with the first voice input by the external server.

10. The method of claim 9, further comprising activating the voice-based intelligent service in response to receiving a second voice input including a designated word or a designated input while the call is performed.

11. The method of claim 9, further comprising:
displaying information indicating that the voice-based intelligent service is activated while the call is performed; and
transmitting the information indicating that the voice-based intelligent service is activated while the call is performed to the first external electronic device.

12. The method of claim 9, further comprising transmitting information for requesting acknowledgement of an invitation to a designated network to the first external electronic device, in response to the first voice input including information related to inviting the first external electronic device to the designated network of the electronic device.

13. The method of claim 9, further comprising transmitting a request to authorize control of at least one second external electronic device to the first external electronic device, in response to the first voice input including information related to controlling the at least one second external electronic device controlled by the first external electronic device.

14. The method of claim 9, further comprising transmitting a request for information related to an account transfer to the first external electronic device, in response to the first voice input including information related to performing an account transfer to an account of a user of the first external electronic device.

15. The method of claim 14, further comprising:
receiving the account transfer-related information from at least one second external electronic device;
performing authentication on the user of the first external electronic device; and
transmitting the received account transfer-related information to the external server based on a result of the authentication.

16. The method of claim 15, wherein performing the authentication on the user of the first external electronic device includes:
identifying, based on an input, password information and/or an input biometric information including iris information, voice pattern information, and/or fingerprint information; and
determining whether the input password information and/or the input biometric information corresponds to pre-stored information to authenticate the user.

* * * * *